(12) United States Patent
Lim et al.

(10) Patent No.: US 10,727,993 B2
(45) Date of Patent: Jul. 28, 2020

(54) APPARATUS AND OPERATING METHOD FOR CONTROLLING INTERFERENCE BETWEEN BASE STATIONS IN WIRELESS COMMUNICATION SYSTEM

(71) Applicant: Samsung Electronics Co., Ltd, Gyeonggi-do (KR)

(72) Inventors: Jongbu Lim, Seoul (KR); Jiyun Seol, Gyeonggi-do (KR); Byunghwan Lee, Gyeonggi-do (KR); Chaehee Lim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/373,451

(22) Filed: Dec. 8, 2016

(65) Prior Publication Data
US 2017/0163392 A1 Jun. 8, 2017

(30) Foreign Application Priority Data
Dec. 8, 2015 (KR) ........................ 10-2015-0174154

(51) Int. Cl.
*H04L 5/00* (2006.01)
*H04W 72/04* (2009.01)
(Continued)

(52) U.S. Cl.
CPC ........... *H04L 5/0032* (2013.01); *H04B 7/024* (2013.01); *H04L 5/0023* (2013.01);
(Continued)

(58) Field of Classification Search
CPC .... H04B 7/0697; H04B 7/024; H04B 7/0617; H04B 7/0786; H04L 5/0032;
(Continued)

(56) References Cited

U.S. PATENT DOCUMENTS

| | | | | |
|---|---|---|---|---|
| 6,078,814 A | * | 6/2000 | Jeffries | H04W 16/02 455/447 |
| 6,144,652 A | * | 11/2000 | Avidor | H01Q 1/246 370/336 |

(Continued)

OTHER PUBLICATIONS

Kosta, B. Hunt, A. U. Quddus and R. Tafazolli, "On Interference Avoidance Through Inter-Cell Interference Coordination (ICIC) Based on OFDMA Mobile Systems," in IEEE Communications Surveys & Tutorials, vol. 15, No. 3, pp. 973-995, Third Quarter 2013.*

(Continued)

*Primary Examiner* — Un C Cho
*Assistant Examiner* — Shah M Rahman

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE). An operating method for controlling interference between base stations in a wireless communication system includes determining at least one or more beam indexes of a first base station, receiving resource information of a second base station from the second base station, determining a frequency resource of the first base station, based on the at least one or more beam indexes of the first base station and the resource information of the second base station, and communicating with a user equipment, using information about the determined frequency resource of the first base station.

17 Claims, 31 Drawing Sheets

(51) Int. Cl.
*H04W 72/08* (2009.01)
*H04B 7/024* (2017.01)

(52) U.S. Cl.
CPC .......... *H04L 5/0044* (2013.01); *H04L 5/0073* (2013.01); *H04W 72/0453* (2013.01); *H04W 72/082* (2013.01); *H04L 5/0091* (2013.01); *H04W 72/046* (2013.01)

(58) Field of Classification Search
CPC ... H04L 5/0023; H04L 5/0044; H04L 5/0073; H04L 5/0091; H04L 7/0073; H04L 5/0017; H04L 5/0058; H04W 72/0453; H04W 72/082; H04W 72/046; B60C 23/0464
See application file for complete search history.

(56) References Cited

U.S. PATENT DOCUMENTS

| | | | | |
|---|---|---|---|---|
| 2004/0213187 | A1* | 10/2004 | Fujii | H04B 7/0408 370/335 |
| 2006/0002360 | A1* | 1/2006 | Ji | H04W 72/1231 370/343 |
| 2007/0155431 | A1* | 7/2007 | Munzner | H04W 72/0406 455/560 |
| 2010/0272077 | A1* | 10/2010 | van Rensburg | H04B 7/024 370/336 |
| 2011/0085448 | A1* | 4/2011 | Kuwahara | H04W 16/10 370/242 |
| 2011/0182375 | A1* | 7/2011 | Kim | H04W 72/0426 375/260 |
| 2011/0211622 | A1* | 9/2011 | Wang | H04B 7/0408 375/220 |
| 2011/0306381 | A1* | 12/2011 | Jia | H04B 7/024 455/522 |
| 2012/0202431 | A1* | 8/2012 | Hawryluck | H04B 7/024 455/63.4 |
| 2013/0136062 | A1* | 5/2013 | Gorokhov | B25B 23/0021 370/328 |
| 2013/0215844 | A1* | 8/2013 | Seol | H04W 72/046 370/329 |
| 2013/0237218 | A1* | 9/2013 | Li | H04W 48/16 455/434 |
| 2014/0024388 | A1* | 1/2014 | Earnshaw | H04W 72/02 455/452.2 |
| 2014/0119261 | A1 | 5/2014 | Wang et al. | |
| 2014/0146782 | A1* | 5/2014 | Gerlach | H04W 72/0426 370/329 |
| 2014/0241296 | A1* | 8/2014 | Shattil | H04B 7/026 370/329 |
| 2014/0256341 | A1* | 9/2014 | Nayeb Nazar | H04W 72/082 455/452.1 |
| 2014/0269642 | A1* | 9/2014 | Forenza | H04J 11/003 370/337 |
| 2015/0016434 | A1* | 1/2015 | Luo | H04W 72/082 370/336 |
| 2015/0103784 | A1* | 4/2015 | Lorca Hernando | H04L 5/0032 370/329 |
| 2015/0110025 | A1* | 4/2015 | Chae | H04B 7/024 370/329 |
| 2015/0156751 | A1* | 6/2015 | Seo | H04B 17/00 370/329 |
| 2015/0189568 | A1* | 7/2015 | Stanze | H04W 16/28 370/331 |
| 2016/0006529 | A1* | 1/2016 | Yi | H04J 11/0056 370/329 |
| 2016/0007347 | A1* | 1/2016 | Nagata | H04W 16/30 370/280 |
| 2016/0249364 | A1* | 8/2016 | Siomina | H04W 72/082 |
| 2016/0269087 | A1* | 9/2016 | Subramanian | H04B 7/024 |
| 2016/0323029 | A1* | 11/2016 | Cheng | H04B 7/0626 370/329 |
| 2017/0026963 | A1* | 1/2017 | Zhang | H04W 72/0446 |
| 2017/0033916 | A1* | 2/2017 | Stirling-Gallacher | H04L 5/1438 |
| 2017/0149480 | A1* | 5/2017 | Kakishima | H04J 11/00 |

OTHER PUBLICATIONS

3GPP, "LTE-Advanced", Jun. 2013, 3GPP, pp. 1-6 (Year: 2013).*
Novlan et al., "Analytical Evaluation of Fractional Frequency Reuse for OFDMA Cellular Networks", Dec. 2011, IEEE, IEEE Transactions on Wireless Communications, vol. 10, No. 12, pp. 4294-4305 (Year: 2011).*
Cisco, "Cisco Visual Networking Index: Global Mobile Data Traffice Forecast Update, 2014-2019", 2015, 42 pages.
Netmanias, "CoMP (1): CoMP Types—CS, CB, JI and DPS", Oct. 10, 2016, http://www.netmanias.com/en/post/blog/6558/comp-lte-lte-a/comp-1-comp-types-cs-cb-jt-and-dps, 4 pages.

* cited by examiner

APPARATUS AND OPERATING METHOD FOR CONTROLLING INTERFERENCE BETWEEN BASE STATIONS IN WIRELESS COMMUNICATION SYSTEM

CROSS-REFERENCE TO RELATED APPLICATION(S) AND CLAIM OF PRIORITY

The present application is related to and claims priority under 35 U.S.C. § 119(a) to a Korean Patent Application entitled "APPARATUS AND OPERATING METHOD FOR CONTROLLING INTERFERENCE BETWEEN BASE STATIONS IN WIRELESS COMMUNICATION SYSTEM" filed in the Korean Intellectual Property Office on Dec. 8, 2015 and assigned Serial No. 10-2015-0174154, the contents of which are herein incorporated by reference.

TECHNICAL FIELD

The present disclosure relates to control of interference between base stations in a wireless communication system.

BACKGROUND

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

To take a traffic characteristic of each base station into consideration, a flexible duplex system configures a mutually different uplink or downlink between base stations. Interference can be generated between the base stations that communicate using the uplink or downlink. A clustering technique can solve the inter-base station interference generated in the flexible duplex system. The clustering technique can include base stations of much interference in the same cluster. The base stations included in the same cluster can use the same uplink or downlink. Also, the clustering technique can include base stations of less interference in mutually different clusters. The base stations included in the mutually different clusters can use a mutually different uplink or downlink.

The clustering technique is applicable to a cell environment of a high density of base stations. However, the clustering technique is inefficient in the cell environment of the high density of base stations, because it is difficult to normally form a cluster in the cell environment of the high density of base stations.

SUMMARY

To address the above-discussed deficiencies, it is a primary object to provide an apparatus and method for fixing a drawback of interference between base stations.

Another exemplary embodiment provides an apparatus and method for fixing a drawback of inter-base station interference generated in a flexible duplex system that configures an uplink and a downlink.

One exemplary embodiment of the present disclosure provides an operating method of a first base station in a wireless communication system. The method includes the processes of determining at least one or more beam indexes of the first base station, receiving resource information of a second base station from the second base station, determining a frequency resource of the first base station, based on the at least one or more beam indexes of the first base station and the resource information of the second base station, and transmitting/receiving data with a user equipment, using information about the determined frequency resource of the first base station. The resource information of the second base station includes beam indexes of the second base station and a frequency resource of the second base station.

Another exemplary embodiment of the present disclosure—provides an operating method of a second base station in a wireless communication system. The method includes the processes of determining at least one beam index of the second base station, determining a frequency resource of the second base station, based on the determined at least one beam index of the second base station, transmitting the determined at least one beam index of the second base station and information about the frequency resource of the second base station, to a first base station, and transmitting/receiving data with a user equipment, using the determined at least one beam index of the second base station and the information about the frequency resource of the second base station.

A further exemplary embodiment of the present disclosure—provides a first base station apparatus. The apparatus includes a communication unit communicating with a second base station and a user equipment, and a control unit operatively combined with the communication unit. The control unit is configured to determine at least one or more beam indexes of the first base station, and receive resource information of a second base station from the second base station, and determine a frequency resource of the first base station, based on the at least one or more beam indexes of the first base station and the resource information of the second base station, and transmit/receive data with a user equipment, using information about the determined frequency resource of the first base station. The resource information of the second base station includes beam indexes of the second base station and a frequency resource of the second base station.

A yet another exemplary embodiment of the present disclosure—provides a second base station apparatus. The apparatus includes a communication unit communicating with a first base station and a user equipment, and a control unit operatively combined with the communication unit. The control unit is configured to determine at least one beam index of the second base station, and determine a frequency resource of the second base station, based on the determined at least one beam index of the second base station, and transmit the determined at least one beam index of the second base station and information about the frequency resource of the second base station, to a first base station, and transmit/receive data with a user equipment, using the determined at least one beam index of the second base station and the information about the frequency resource of the second base station.

Various exemplary embodiments can improve system performance by reducing the influence of inter-base station interference generated in a wireless communication system.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 27, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication devices.

The operation principle of various embodiments is described below in detail with reference to the accompanying drawings. In describing various embodiments below, related well-known functions or constructions are not described in detail since they would obscure the gist of the invention in unnecessary detail. And, the terms described below, terms defined considering functions in various embodiments, can be modified in accordance to user and operator's intention, practice, etc. Therefore, the definition should be given on the basis of the content throughout the present specification.

Below, the present disclosure is described for a technology capable of efficiently controlling interference between base stations in a wireless communication system.

In the following description, the term denoting each entity (e.g., a base station and a user equipment), the term denoting a signal processing scheme (e.g., beamforming), the term (e.g., an interfering base station and an interfered base station) distinguishing the relationship of interference of base stations, etc. are exemplified for description convenience. Accordingly, the present invention is not limited to the terms described later, and can use other terms having equivalent technological meanings.

Figure 1:
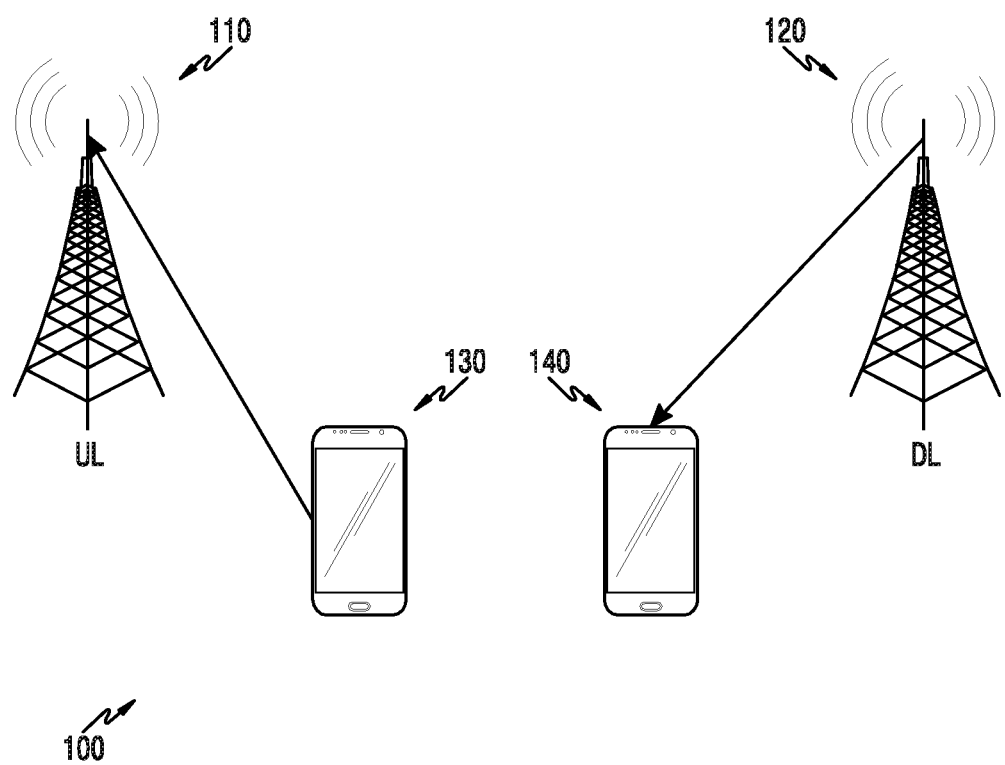
FIG. 1 illustrates a wireless communication system.

FIG. 1 illustrates a wireless communication system 100. Referring to FIG. 1, the wireless communication system 100 can include a Base Station (BS) 110, a base station 120, a User Equipment (UE) 130, and/or a user equipment 140. In accordance with a network type, the term base station can be interchanged with the terms node B and/or evolved node B (e-node B). Also, the term base station can be interchanged with the term access point. In accordance with a network type, the term user equipment can be interchanged with the terms terminal and/or mobile station. Also, the term user equipment can be interchanged with the terms subscriber station, remote terminal, and/or wireless terminal.

The base station 110 can communicate with the base station 120, the user equipment 130, and/or the user equipment 140. The base station 120 can communicate with the user equipment 130 and/or the user equipment 140. In this case, the base station 110 and the base station 120 can use the same UpLink (UL) during the same time, or can use the same DownLink (DL) during the same time. Also, the base station 110 and the base station 120 can use a mutually different uplink and/or downlink during the same time. For example, in a duplex system, the base station 110 can receive a signal from the user equipment 130 for a constant time by using an uplink, and the base station 120 can transmit a signal to the user equipment 140 during the same time by using a downlink. For description convenience, FIG. 1 illustrates a process in which the base station 110 receives a signal from the user equipment 130, and the base station 120 transmits a signal to the user equipment 140 but, according to cases, the base station 110 can transmit a signal to the user equipment 130 by using a downlink, and the base station 120 can receive a signal from the user equipment 140 by using an uplink.

In the detailed description and drawings described below, a transmission signal of a base station that performs communication with a user equipment by using a downlink can exert interference on a signal that an adjacent base station receives from a user equipment, so the base station using the downlink can be referred to as an interfering base station. Similarly, a reception signal of a base station that performs communication with a user equipment by using an uplink can receive the interference of a signal that an adjacent base station transmits to a user equipment, so the base station using the uplink can be referred to as an interfered base station. For example, in FIG. 1, the base station 110 receiving a signal from the user equipment 130 can be referred to as an interfered base station. Also, in FIG. 1, the base station 120 transmitting a signal to the user equipment 140 can be referred to as an interfering base station. However, the terms do not limit the scope of right of the present invention, and the base station 110 can be an interfering base station and the base station 120 can be an interfered base station as well.

Figure 2A:
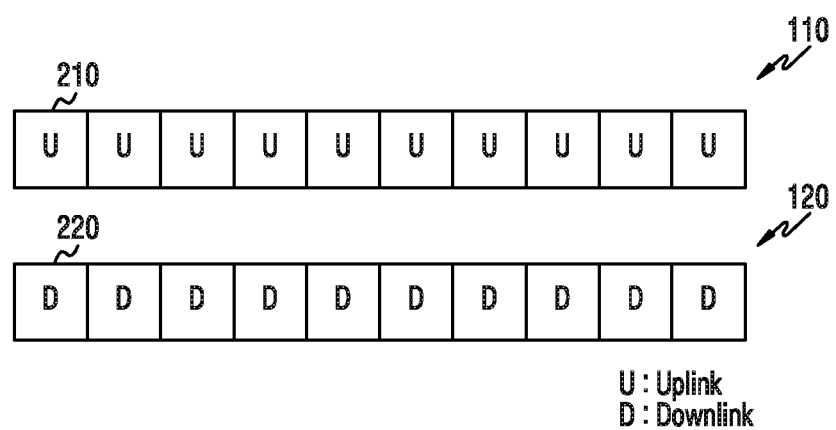
FIG. 2A to FIG. 2C illustrate frame structures for uplink and downlink in a wireless communication system.
Figure 2B:
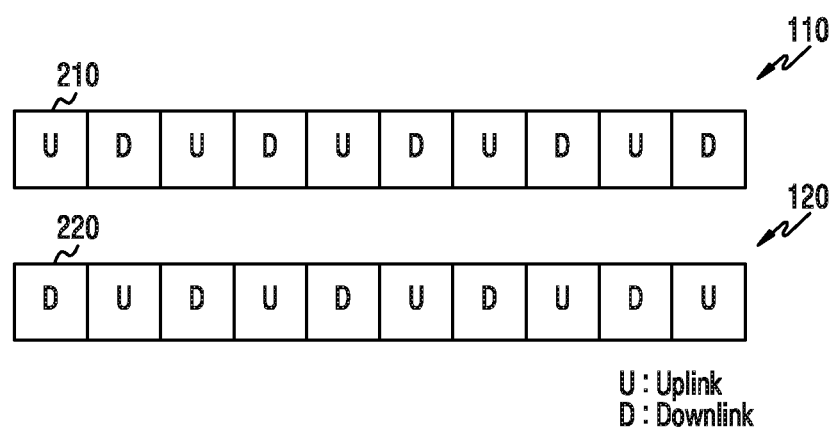
Figure 2C:
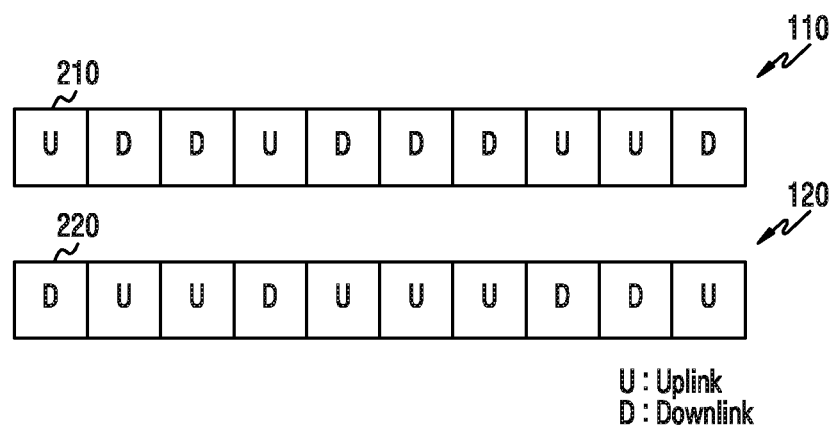

FIG. 2A to FIG. 2C illustrate frame structures for uplink and downlink in a wireless communication system.

FIG. 2A illustrates an example in which the base station 110 and/or the base station 120 use an uplink and a downlink separately in the wireless communication system. Referring to FIG. 2A, a resource block 210 and a resource block 220 represent resource blocks allocated at a constant time. The resource block 210 represents a resource block allocated for an uplink, and the resource block 220 represents a resource block allocated for a downlink. In this case, it can be meant that one resource block is allocated at one millisecond (ms). For example, referring to FIG. 2A, the base station 110 communicates with a user equipment by using only an uplink. Also, the base station 120 communicates with a user equipment by using only a downlink. For description convenience, FIG. 2A illustrates an operation in which the base station 110 communicates with a user equipment by using only an uplink, and the base station 120 communicates with a user equipment by using only a downlink but, according to cases, the base station 110 can communicate with the user equipment by using a downlink, and the base station 120 can communicate with the user equipment by using an uplink.

FIG. 2B illustrates a frame structure in a wireless communication system applying a Time Division Duplex (TDD) technique. Referring to FIG. 2B, the base station 110 can use an uplink for a constant period of time, while the base station 120 can use a downlink during the same time. The period of time is constant, and can be previously determined. For example, in FIG. 2B, the base station 110 can change an uplink and a downlink every 1 ms. Though not illustrated in FIG. 2B, an operation in which the base station 110 changes an uplink and a downlink every 3 ms can be assumed. In this case, the base station 110 can perform an uplink or downlink based communication, using three resource blocks.

FIG. 2C illustrates a frame structure in a wireless communication system applying a flexible TDD technique. Referring to FIG. 2C, a period of time for which the base station 110 and/or the base station 120 use an uplink and a downlink can be flexible. For example, as illustrated in FIG. 2C, the base station 110 can use an uplink for a period of time of 1 ms and can use a downlink for a period of time of 2 ms. Also, the base station 120 can use a downlink for a period of time of 1 ms and use an uplink for a period of time of 2 ms. The period of time can be determined considering uplink and downlink traffics. For example, if the base station 110 receives signals from a majority of user equipments, whereas a majority of signals that the base station 120 receives are not required, the base station 110 can communicate with the user equipments using an uplink for a long time. For another example, if the base station 110 receives signals from a minority of user equipments, whereas a majority of signals that the base station 120 receives are required, the base station 110 can communicate with the user equipments using an uplink for a short time.

The flexible TDD technique can provide a method for making efficient use of resources by dynamically allocating the resources between base stations. However, the flexible TDD technique can cause a drawback of interference generated between the base stations (i.e., a drawback of interference between an uplink and a downlink).

Figure 3:
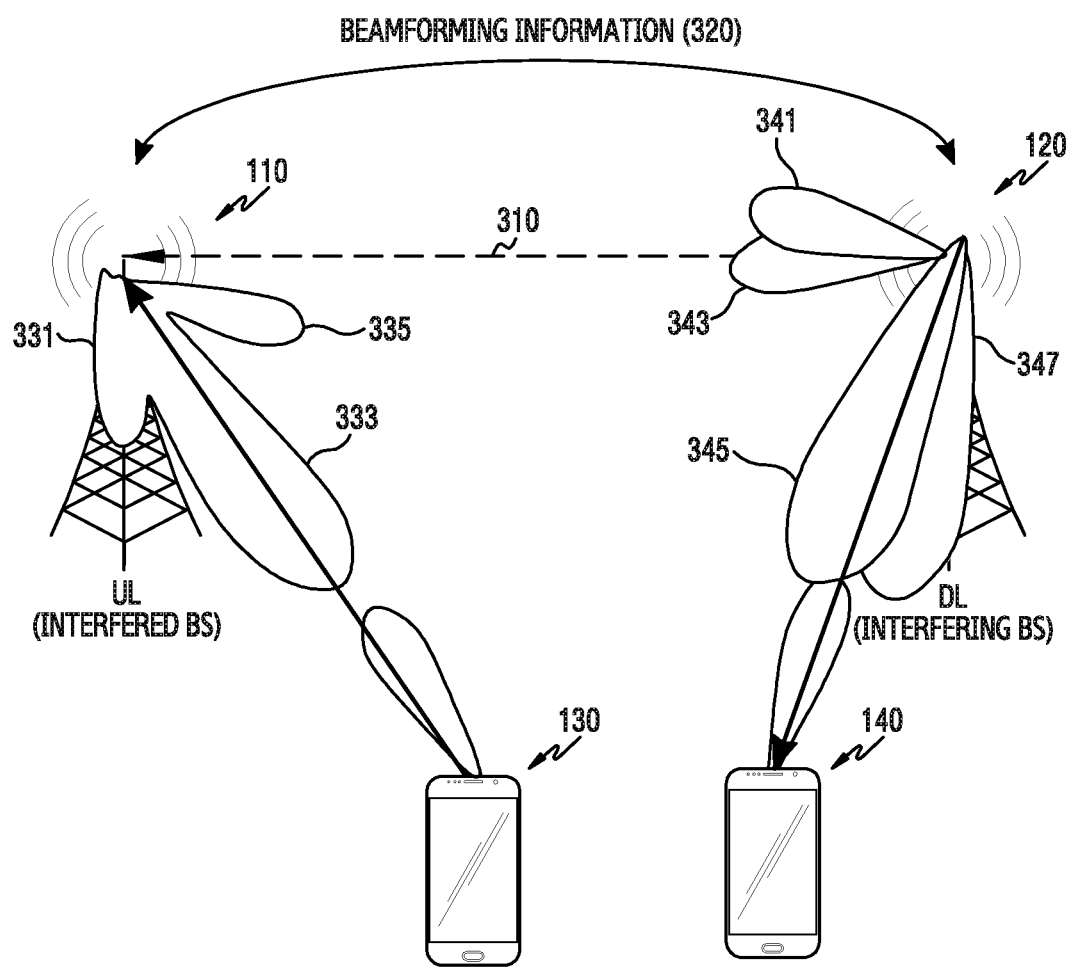
FIG. 3 illustrates a wireless communication system according to various embodiments.

FIG. 3 illustrates a wireless communication system according to various embodiments. A base station 110, a base station 120, a user equipment 130, and a user equipment 140 illustrated in FIG. 3 correspond with the base stations and the user equipments illustrated in FIG. 1.

Referring to FIG. 3, the base station 110 receives a signal from the user equipment 130, using an uplink. Referring also to FIG. 3, the base station 120 transmits a signal to the user equipment 140, using a downlink. For description convenience, FIG. 3 illustrates an operation in which the base station 110 receives a signal from the user equipment 130 by using the uplink, and the base station 120 transmits a signal to the user equipment 140 by using the downlink but, according to cases, the base station 110 can transmit a signal to the user equipment 130 by using a downlink, and the base station 120 can receive a signal from the user equipment 140 by using an uplink. For description convenience, FIG. 3 illustrates an operation in which only the user equipment 130 and/or the user equipment 140 communicate with the base station 110 and/or the base station 120, but a plurality of user equipments can communicate with the base station 110 or the base station 120 by using an uplink or a downlink.

In FIG. 3, the base station 120 can perform beamforming for forming a transmit beam in order to communicate with the user equipment 140. The beamforming process can include a process of determining a beam index, and a process of allocating a frequency resource to a user equipment. The base station 110 can perform beamforming for forming a receive beam in order to receive a signal from the user equipment 130. The beam index indicates a specific beam for communicating with a specific user terminal among a plurality of beams usable in the base station 110 and/or the base station 120. For example, the base station 110 can use a receive beam 331, a receive beam 333, and/or a receive beam 335. Also, the base station 120 can use a transmit beam 341, a transmit beam 343, a transmit beam 345, and/or a transmit beam 347. The base station 110 can determine the best receive beam index for receiving a signal from the user equipment 130. For example, the base station 110 can determine the receive beam 333 so as to receive a signal from the user equipment 130. Also, the base station 120 can determine the best transmit beam index for transmitting a signal to the user equipment 140. For example, the base station 120 can determine the transmit beam 345 so as to transmit a signal to the user equipment 140. For another example, the base station 110 and/or the base station 120 can determine at least one or more receive beam indexes and/or at least one or more transmit beam indexes. The base station 110 can determine all of the receive beam 331, the receive beam 333, and/or the receive beam 335 in order to receive signals from a plurality of user equipments. The base station 120 can determine all of the transmit beam 341, the transmit beam 343, the transmit beam 345, and/or the transmit beam 347 in order to transmit signals to a plurality of user equipments.

But, in a situation illustrated in FIG. 3, a signal that the base station 120 transmits can exert interference on the base station 110 (reference numeral 310). For example, signals that the base station 120 transmits in the directions of the transmit beam 343 and/or the transmit beam 345 can be overlapped or canceled with a signal that the base station 110 receives in the direction of the receive beam 335.

To fix the drawbacks, the base station 110 and the base station 120 can share beamforming information 320 with each other. The beamforming information 320 can include beam indexes information. For example, the base station 110 can transmit beam indexes information about the receive beam 331, the receive beam 333 and/or the receive beam 335, to the base station 120. Also, the beamforming information 320 can include beam indexes information generating interference between the base station 110 and the base station 120. For example, the beamforming information 320 can indicate the result that interference is generated between the receive beam 335 and the transmit beam 341 and/or transmit beam 343. The base station 110 and the base station 120 each can determine a beam index and frequency resource of less influence of interference, based on the mutually shared beamforming information 320.

Figure 4:
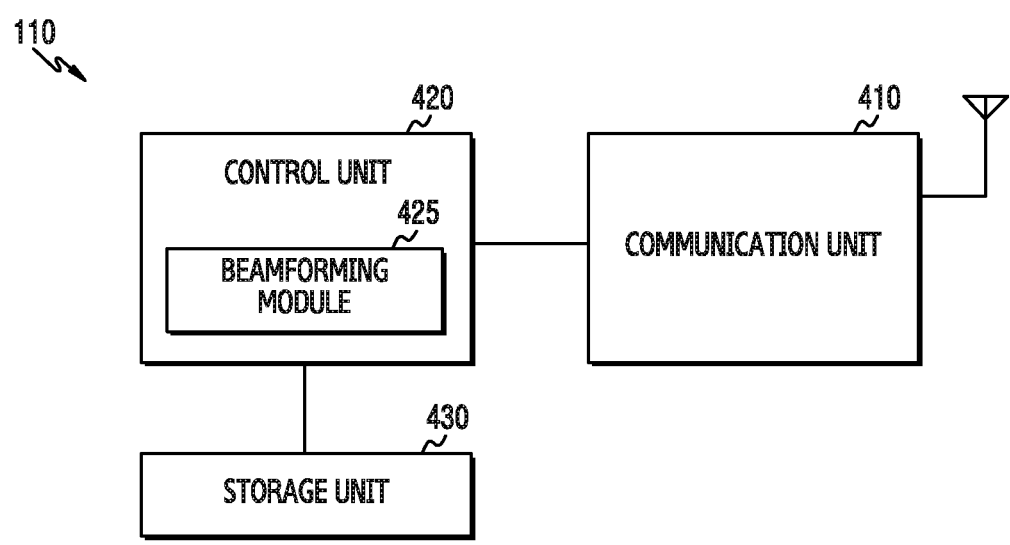
FIG. 4 illustrates a block diagram of an interfered base station according to various embodiments.

FIG. 4 illustrates a block diagram of an interfered base station according to various embodiments. The interfered base station can correspond to the base station 110 illustrated in FIG. 1 and FIG. 3. Below, the terms " . . . unit", " . . . er", etc. represent the unit of processing at least one function or operation, and the terms can represent hardware, software or a combination of the hardware and the software.

Referring to FIG. 4, the base station 110 can include a communication unit 410, a control unit 420, and/or a storage unit 430. The communication unit 410 can include a transmission filter, a reception filter, an amplifier, a mixer, an oscillator, a Digital to Analog Converter (DAC), an Analog to Digital Converter (ADC), etc. The communication unit 410 performs functions for transceiving signals with other base stations through an antenna. For example, the communication unit 410 performs a function of conversion between a baseband signal and a bit stream in compliance with the physical layer standard of a system. For example, at data transmission, the communication unit 410 generates complex symbols by encoding and modulating a transmission bit stream. Also, at data reception, the communication unit 410 restores a reception bit stream by demodulating and decoding a baseband signal. Also, the communication unit 410 up converts a baseband signal into a Radio Frequency (RF) band signal and then transmits the RF band signal through an antenna, and down converts an RF band signal received through the antenna into a baseband signal. For example, the communication unit 410 can receive at least one or more transmit beam indexes information for using a downlink, from the base station 120. For another example, the communication unit 410 can transmit interference table information generated by the control unit 420, to the base station 120. Here, the interference table information is information including at least one or more beam indexes generating interference between the base station 110 and the base station 120. In detail, the interference table information can indicate at least one beam pair causing mutual interference between beams of the base station 110 and beams of the base station 120. In accordance with another embodiment, the interference table information can be information including at least one or more beam indexes not generating interference between the base station 110 and the base station 120. An operating method for generating the interference table information will be described later in FIG. 7.

For another example, the communication unit 410 can transmit beamforming information for an uplink determined by the control unit 420, to the base station 120. For further example, the communication unit 410 can receive an uplink signal, using the beamforming information determined by the control unit 420.

The control unit 420 can include at least one processor or micro processor or can be a part of the processor. The control unit 420 can control the general operations of the base station 110. For example, the control unit 420 can transceive a signal through the communication unit 410. Also, the control unit 420 can record data in the storage unit 430, and load the data. For example, the control unit 420 can determine at least one or more receive beam indexes for using an uplink. For another example, the control unit 420 can generate interference table information, based on at least one or more transmit beam indexes received from the base station 120 and/or the at least one or more receive beam indexes.

The storage unit 430 can consist of a volatile memory, a non-volatile memory, or a combination of the volatile memory and the non-volatile memory. The storage unit 430 can store data such as a basic program for an operation of the base station 110, an application program, setting information, etc. For example, the control unit 430 can store interference table information that is generated based on at least one or more transmit beam indexes received from the base station 120 and/or at least one or more receive beam indexes.

The control unit 420 can include a beamforming module 425. The beamforming module 425 can be configured to perform beamforming for an uplink. For example, the beamforming module 425 can determine a receive beam index for the uplink and a frequency resource, based on beamforming related information received from the base station 120 and interference table information.

Figure 5:
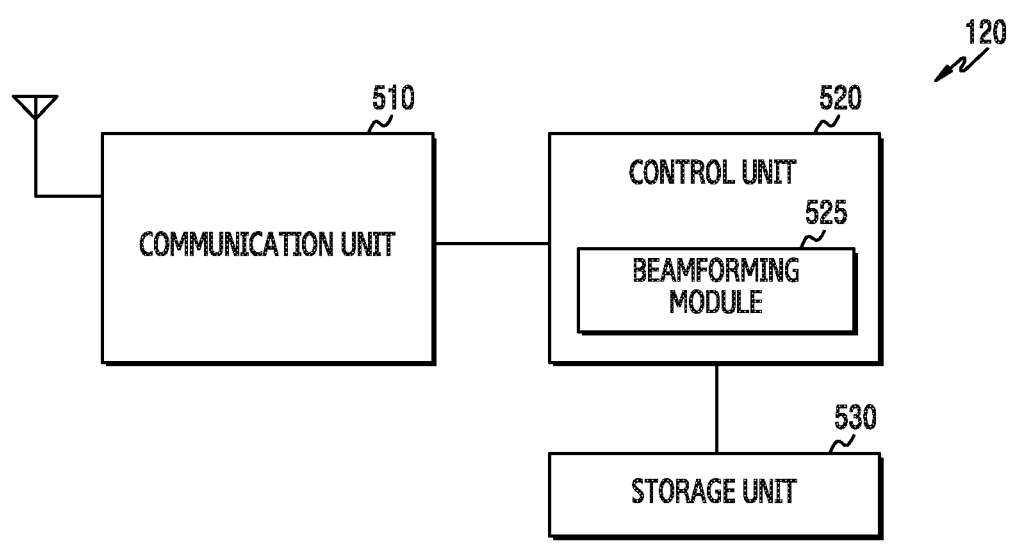
FIG. 5 illustrates a block diagram of an interfering base station according to various embodiments.

FIG. 5 illustrates a block diagram of an interfering base station according to various embodiments. The interfering base station can correspond to the base station 120 illustrated in FIG. 1 and FIG. 3.

Referring to FIG. 5, the base station 120 can include a communication unit 510, a control unit 520, and/or a storage unit 530. The communication unit 510 can include a transmission filter, a reception filter, an amplifier, a mixer, an oscillator, a DAC, an ADC, etc. The communication unit 510 performs functions for transceiving signals with other base stations through an antenna. For example, the communication unit 510 performs a function of conversion between a baseband signal and a bit stream in compliance with the physical layer standard of a system. For example, at data transmission, the communication unit 510 generates complex symbols by encoding and modulating a transmission bit stream. Also, at data reception, the communication unit 510 restores a reception bit stream by demodulating and decoding a baseband signal. Also, the communication unit 510 up converts a baseband signal into an RF band signal and then transmits the RF band signal through an antenna, and down converts an RF band signal received through the antenna into a baseband signal. For example, the communication unit 510 can receive at least one or more receive beam indexes information for using an uplink from the base station 110. For another example, the communication unit 510 can transmit at least one or more transmit beam indexes information to the base station 110. For further example, the communication unit 510 can receive beamforming information for an uplink from the base station 110. For yet another example, the communication unit 510 can receive a downlink signal, using beamforming information for a downlink determined by the control unit 520.

The control unit 520 can include at least one processor or micro processor or can be a part of the processor. The control unit 520 can control the general operations of the base station 120. For example, the control unit 520 can transceive a signal through the communication unit 510. Also, the control unit 520 can record data in the storage unit 530, and load the data. For example, the control unit 520 can determine at least one or more transmit beam indexes for using a downlink.

The storage unit 530 can consist of a volatile memory, a non-volatile memory, or a combination of the volatile memory and the non-volatile memory. The storage unit 530 can store data such as a basic program for an operation of the base station 120, an application program, setting information, etc. For example, the storage unit 530 can store at least one or more receive beam indexes received from the base station 110, and interference table information.

The control unit 520 can include a beamforming module 525. The beamforming module 525 can be configured to determine beamforming information for a downlink. For example, the beamforming module 525 can determine a transmit beam index for a downlink and a resource, based on at least one or more receive beam indexes received from the base station 110, interference table information, and/or at least one or more transmit beam indexes determined by the control unit 520.

Figure 6:
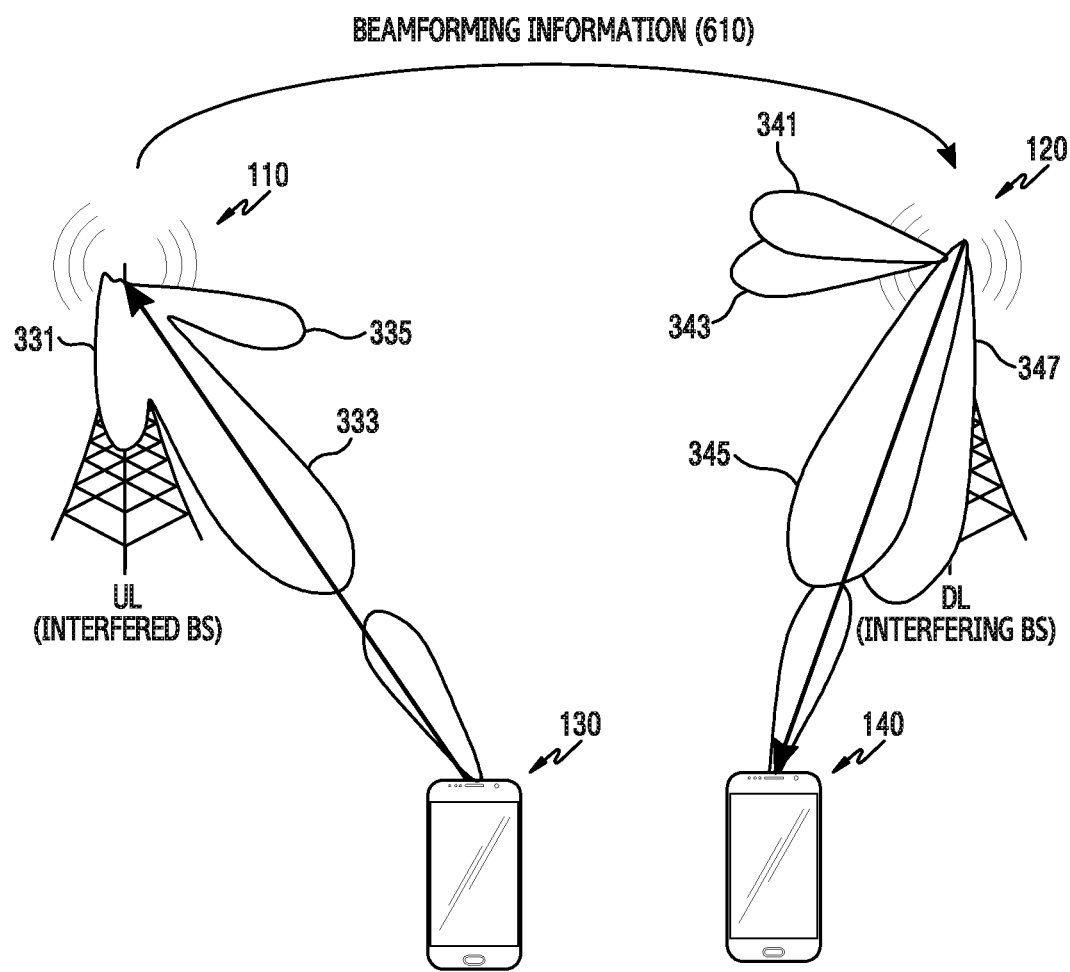
FIG. 6 illustrates a wireless communication system according to one embodiment.

FIG. 6 illustrates a wireless communication system according to one embodiment. FIG. 6 exemplifies an operation in which an interfering base station performs beamforming for transmitting a downlink signal, based on beamforming information received from an interfered base station. A base station 110, a base station 120, a user equipment 130, and a user equipment 140 illustrated in FIG. 6 correspond with the base stations and the user equipments illustrated in FIG. 1.

Referring to FIG. 6, the base station 110 transmits beamforming information 610 determined by the control unit 420, to the base station 120. The beamforming information 610 can include a receive beam index for an uplink and a frequency resource. Also, the beamforming information 610 can include interference table information. Also, the beamforming information 610 can include subframe indexes information. Each of subframe indexes can be determined based on an uplink/downlink traffic. In the present disclosure, the beamforming information 610 is described as including subframe indexes information, but a subframe can be replaced with a slot in accordance with an implementation method. For example, the beamforming information 610 can include time slot indexes information.

The base station 120 can determine beamforming information for a downlink, based on the received beamforming information 610 for the uplink and at least one or more transmit beam indexes determined by the control unit 520. The determined beamforming information for the downlink can include a transmit beam index for a downlink and a frequency resource. The transmit beam index and frequency resource correspond to a transmit beam index and frequency resource for minimizing interference between the base station 110 and the base station 120. Also, the determined beamforming information can include subframe indexes. The base station 120 can transmit a downlink signal to the user equipment 140, using the determined beamforming information.

Figure 7:
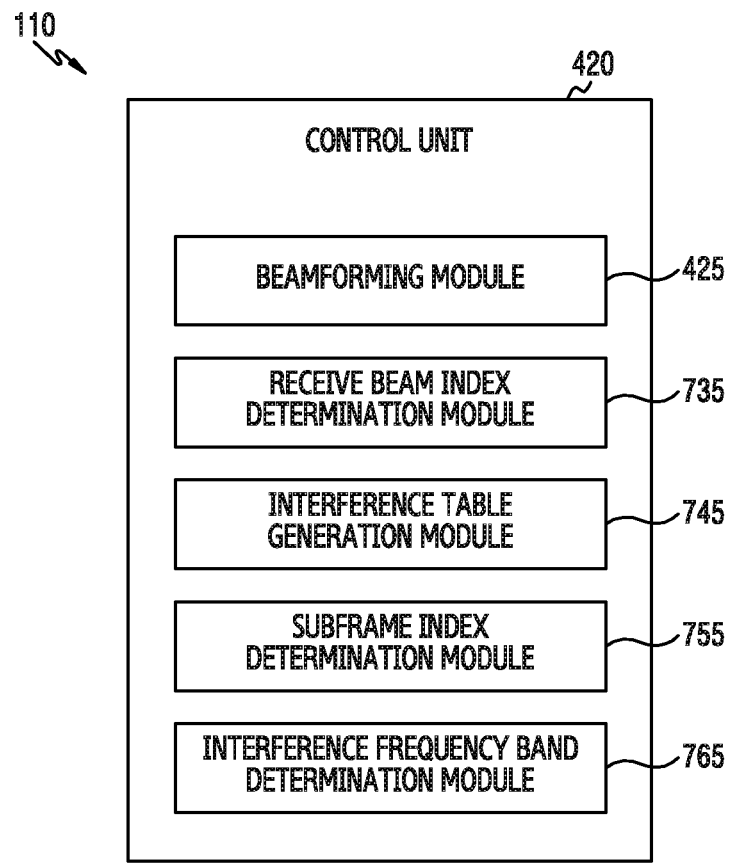
FIG. 7 illustrates a block diagram of an interfered base station according to one embodiment.

FIG. 7 illustrates a block diagram of an interfered base station according to one embodiment. The interfered base station can correspond to the base station 110 illustrated in FIG. 1, FIG. 3 and FIG. 6. Below, the term "module" represents the unit of processing at least one function or operation, and the term can represent hardware, software, or a combination of the hardware and the software.

Referring to FIG. 7, the control unit 420 can further include a receive beam index determination module 735, an interference table generation module 745, a subframe index determination module 755, and/or an interference frequency band determination module 765. The receive beam index determination module 735 can determine at least one or more receive beam indexes for the base station 110 to receive each uplink signal from a plurality of user equipments. The at least one or more receive beam indexes indicate receive beams suitable for receiving a signal from each user equipment. For example, in FIG. 6, the base station 110 can determine the receive beam 333 in order to receive a signal from the user equipment 130. For another example, in FIG. 6, the base station 110 can determine the receive beam 335 in order to receive a signal from the user equipment 140.

The interference table generation module 745 can determine at least one or more beam indexes generating interference between the base station 110 and the base station 120. For example, the base station 110 can detect signals that the base station 120 transmits to user equipments, and determine if the base station 110 receives the influence of interference from the base station 120. For another example, the base station 110 can previously transmit/receive a signal with the base station 120 so as to previously determine indexes of signals receiving the influence of interference from the base station 120. The interference table generation module 745 can add at least one or more beam indexes being under the influence of interference between a signal that the base station 120 transmits to a user equipment and a signal that the base station 110 receives from a user equipment, to an interference table list. Also, the interference table generation module 745 can add at least one or more beam indexes not being under the influence of interference, to the interference table list as well. For example, in FIG. 6, the base station 110 can determine that the transmit beam 343 and/or transmit beam 341 of the base station 120 can exert the influence of interference on the receive beam 335 of the base station 110. In this case, the interference table generation module 745 can add the transmit beam 343 and/or transmit beam 341 exerting the influence of interference on the receive beam 335, to the interference table list. For another example, in FIG. 6, the base station 110 can determine that the receive beam 331 of the base station 110 does not receive the influence of any one of the transmit beams of the base station 120. In this case, the interference table generation module 745 can add the transmit beam 341, transmit beam 343, transmit beam 345 and/or transmit beam 347 not exerting the influence of interference on the receive beam 331, to the interference table list. When a base station is installed, the interference table generation module 745 can generate the interference table list. Also, when hardware included in the base station is changed, the interference table generation module 745 can generate the interference table list. For example, when a construction of an antenna included in the base station is changed, the interference table generation module 745 can generate the interference table list.

The subframe index determination module 755 can determine the usage of each subframe in accordance with a traffic characteristic of each base station or a buffer state thereof. In the present disclosure, for description convenience, the subframe index determination module 755 has been described as determining the usage of each subframe, but the subframe can be replaced with a slot. For example, the subframe index determination module 755 can determine the usage of each time slot in accordance with a traffic characteristic of each base station or a buffer state thereof. Here, the usage represents if a corresponding subframe is used for uplink communication or is used for downlink communication. Each of subframe indexes indicates each of the subframes. Here, the subframes can be allocated based on a time resource or frequency resource. For example, in FIG. 2A to FIG. 2C, one resource block can correspond to one subframe. Each of the subframe indexes indicates each of a plurality of subframes illustrated in FIG. 2A to FIG. 2C. Here, the subframes can be allocated based on a time resource or frequency resource. The subframe index determination module 755 can determine subframe indexes receiving a signal for an uplink, in consideration of traffics between the base station 110 and a plurality of user equipments.

The interference frequency band determination module 765 can determine a frequency band in which a signal for an uplink that the base station 110 receives from a user equipment receives the interference of a signal for a downlink that the base station 120 transmits to a user equipment.

Figure 8:
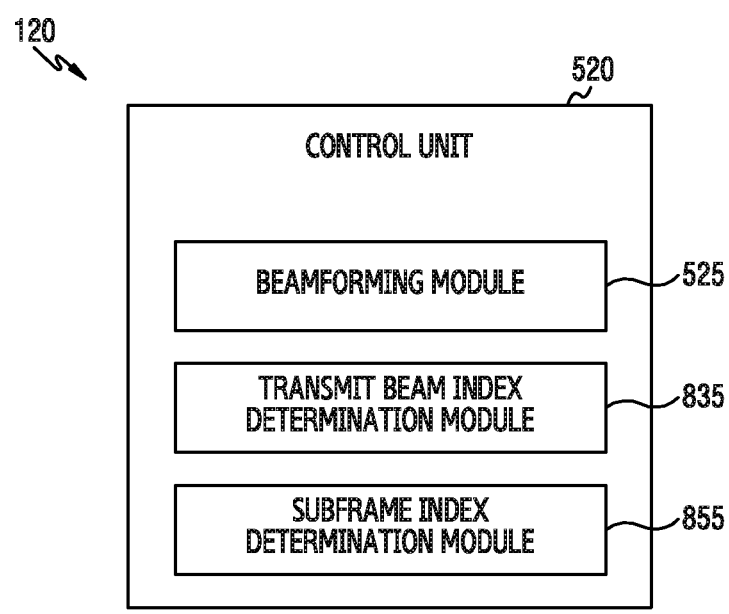
FIG. 8 illustrates a block diagram of an interfering base station according to one embodiment.

FIG. 8 illustrates a block diagram of an interfering base station according to one embodiment. The interfering base station can correspond to the base station 120 illustrated in FIG. 1, FIG. 3 and FIG. 6.

Referring to FIG. 8, the control unit 520 can further include a transmit beam index determination module 835 and/or a subframe index determination module 855. The transmit beam index determination module 835 can determine at least one or more transmit beam indexes for the base station 120 to transmit each downlink signal to a plurality of user equipments. The at least one or more transmit beam indexes indicate transmit beams suitable for transmitting a signal to each user equipment. For example, in FIG. 6, the base station 120 can determine the transmit beam 345 so as to transmit a signal to the user equipment 140.

The subframe index determination module 855 can determine the usage of each subframe in accordance with a traffic characteristic of each base station or a buffer state thereof. Here, the usage represents if a corresponding subframe is used for uplink communication or is used for downlink communication. Each of subframe indexes indicates each of subframes. Here, the subframes can be allocated based on a time resource or a frequency resource. The subframe index determination module 855 can determine subframe indexes transmitting a signal for a downlink, in consideration of traffics between the base station 120 and a plurality of user equipments.

Figure 9:
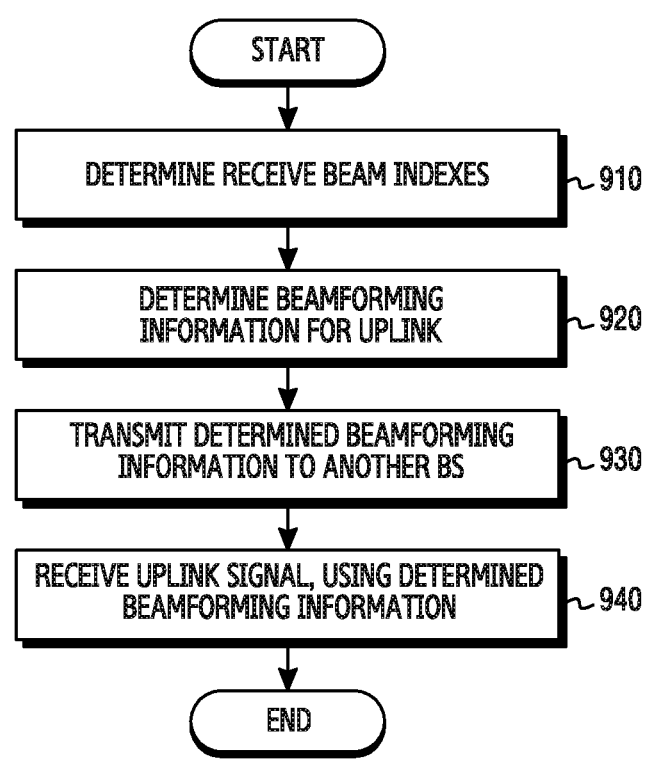
FIG. 9 illustrates a flowchart of an operation of an interfered base station according to one embodiment.

FIG. 9 illustrates a flowchart of an operation of an interfered base station according to one embodiment. The interfered base station exemplifies an operation method of the base station 110 of FIG. 6.

Referring to FIG. 9, in step 910, the base station 110 can determine at least one or more receive beam indexes for an uplink. The receive beam indexes can be determined by periods. For example, the base station 110 can determine new receive beam indexes so as to communicate with other user equipments after receiving an uplink signal in step 940.

In step 920, the base station 110 can determine beamforming information for an uplink, based on the determined at least one or more receive beam indexes. The beamforming information includes beam indexes, subframe indexes, and a frequency resource. The determined beamforming information is determined in consideration of the influence of interference between the base station 110 and the base station 120. The base station 110 can periodically determine the beamforming information. For example, the base station 110 can update the beamforming information, based on the at least one or more receive beam indexes information that are updated after receiving an uplink signal in step 940.

In step 930, the base station 110 can transmit the determined beamforming information to another base station. For example, the base station 110 can transmit the determined beamforming information to the base station 120 transmitting a downlink signal. Also, the base station 110 can periodically transmit the determined beamforming information. For example, the base station 110 can transmit the beamforming information that is updated after receiving an uplink signal, to the base station 120. The base station 120 will determine a beam index for a downlink of the base station 120 and a frequency resource, based on the received beamforming information.

In step 940, the base station 110 can receive an uplink signal, using the determined beamforming information. For example, the base station 110 can receive an uplink signal, using the determined at least one or more receive beam indexes and a receive beam index and frequency resource determined based on interference table information. The uplink signal can correspond to a signal minimizing the influence of interference of a downlink signal that the base station 120 transmits. The base station 110 can periodically receive the uplink signal. Here, the uplink signal can be a signal generated from a user equipment different from the existing user equipment transmitting a signal.

Figure 10:
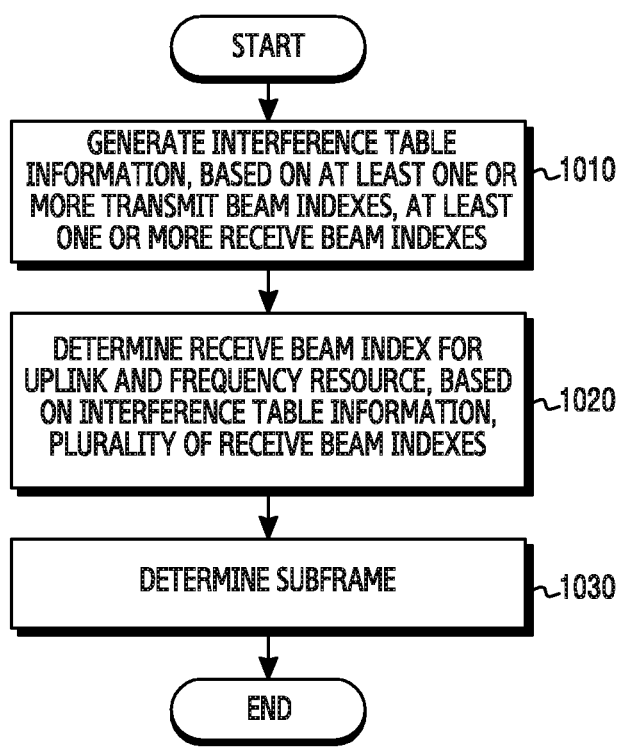
FIG. 10 illustrates a flowchart of an operation of an interfered base station for beamforming determination according to one embodiment.

FIG. 10 illustrates a flowchart of an operation of an interfered base station for beamforming determination according to one embodiment. FIG. 10 is a diagram embodying step 920 illustrated in FIG. 9.

Referring to FIG. 10, in step 1010, the base station 110 can generate interference table information, based on at least one or more transmit beam indexes received from the base station 120 and/or at least one or more receive beam indexes determined by the control unit 420. The base station 110 can periodically generate the interference table information. For example, the base station 110 can update the interference table information, based on at least one or more receive beam indexes that are updated after receiving an uplink signal in step 940 illustrated in FIG. 9.

In step 1020, the base station 110 can determine a receive beam index for an uplink and a frequency resource, based on the interference table information and the at least one or more receive beam indexes. The receive beam index for the uplink is determined in consideration of interference of a signal that the base station 120 transmits using a downlink.

In step 1030, the base station 110 can determine subframe indexes, based on the determined receive beam index and frequency resource. For description convenience, FIG. 10 illustrates step 1020 and step 1030 in order, but the base station 110 can concurrently determine the receive beam index for the uplink, the frequency resource and/or the subframe indexes.

Figure 11:
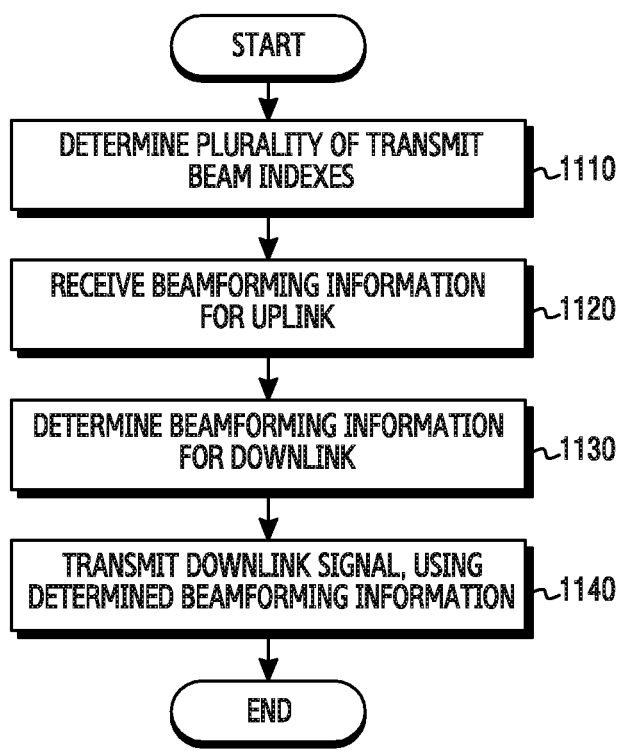
FIG. 11 illustrates a flowchart of an operation of an interfering base station according to one embodiment.

FIG. 11 illustrates a flowchart of an operation of an interfering base station according to one embodiment. The interfering base station can correspond to the base station 120 of FIG. 6.

Referring to FIG. 11, in step 1110, the base station 120 can determine at least one or more transmit beam indexes. The base station 120 can periodically determine the at least one or more transmit beam indexes. For example, the base station 120 can update at least one or more transmit beam indexes information after transmitting a downlink signal in step 1140.

In step 1120, the base station 120 can receive beamforming information for an uplink from the base station 110. The beamforming information for the uplink can be received by periods. For example, the base station 120 can receive beamforming information updated by the base station 110 after transmitting a downlink signal in step 1140. For description convenience, FIG. 11 illustrates step 1110 and step 1120 in order, but the base station 120 can determine the at least one or more transmit beam indexes after receiving the beamforming information for the uplink.

In step 1130, the base station 120 can determine beamforming information for a downlink, based on the determined at least one or more transmit beam indexes information and/or the received beamforming information. The beamforming information for the downlink can be determined by periods. For example, the base station 120 can again determine beamforming for a downlink, based on the updated beamforming information received after transmitting a downlink signal in step 1140.

In step 1140, the base station 120 can transmit a downlink signal, using the determined beamforming information. The downlink signal can be transmitted by periods. For example, the base station 120 can transmit a downlink signal, using the again determined beamforming information for the downlink. Here, the downlink signal can be transmitted to a user equipment different from a user equipment receiving an existing signal.

Figure 12:
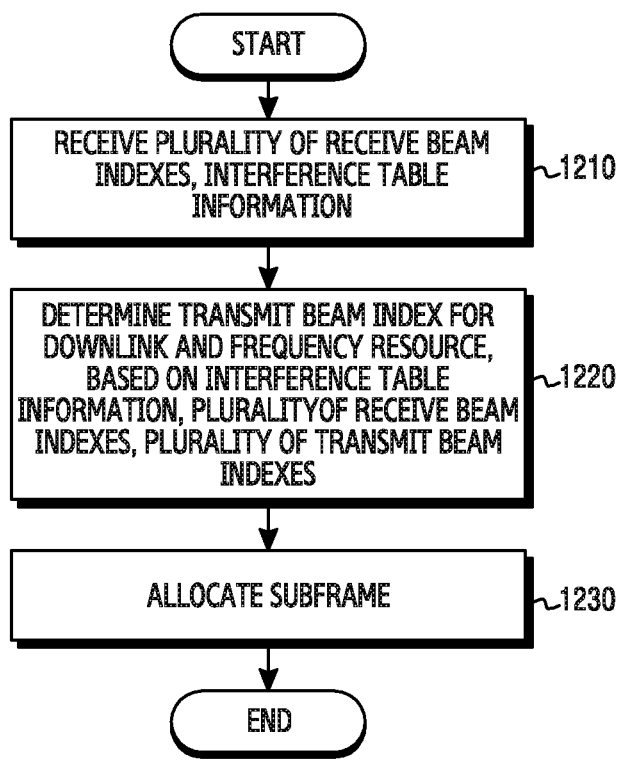
FIG. 12 illustrates a flowchart of an operation of an interfering base station for beamforming determination according to one embodiment.

FIG. 12 illustrates a flowchart of an operation of an interfering base station for beamforming determination according to one embodiment. The interfering base station can correspond to the base station 120 of FIG. 6.

Referring to FIG. 12, in step 1210, the base station 120 can receive at least one or more receive beam indexes information and interference table information from the base station 110. The at least one or more receive beam indexes information and the interference table information can be received concurrently. Also, the at least one or more receive beam indexes information can be first received or the interference table information can be first received. The base station 120 can periodically receive the at least one or more receive beam indexes information and the interference table information. For example, the base station 120 can receive at least one or more receive beam indexes information and interference table information that are updated after transmitting a downlink signal in step 1140 illustrated in FIG. 11.

In step 1220, the base station 120 can determine a transmit beam index for a downlink and a frequency resource, based on the interference table information, at least one or more transmit beam indexes, and/or the at least one or more receive beam indexes information. The transmit beam index for the downlink is determined in consideration of interference of a signal that the base station 110 receives using an uplink.

In step 1230, the base station 120 can allocate subframe indexes, based on the determined transmit beam index and frequency resource. For description convenience, FIG. 12 illustrates step 1220 and step 1230 in order, but the base station 120 can concurrently determine the transmit beam index for the uplink, the frequency resource, and/or the subframe indexes.

Figure 13:
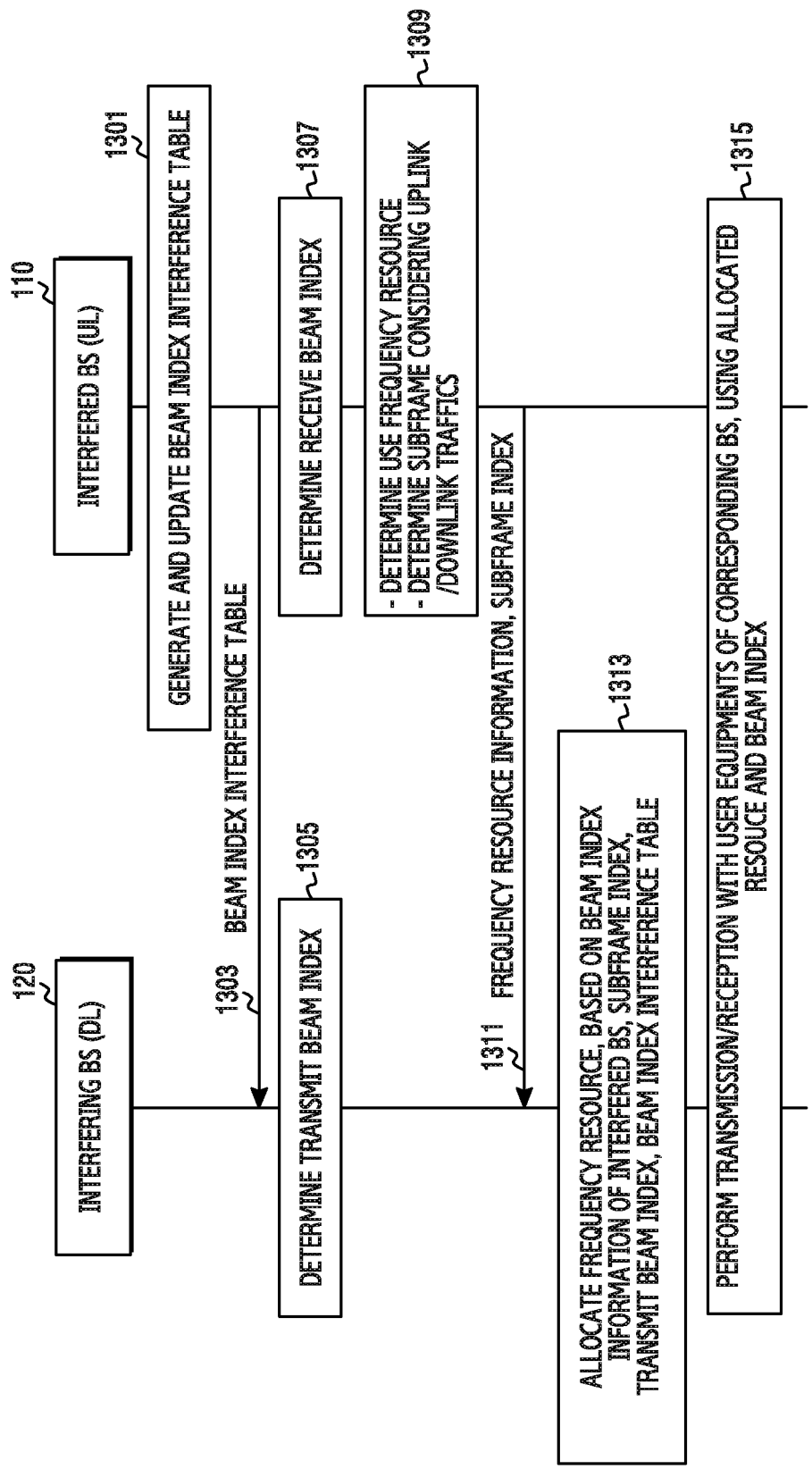
FIG. 13 illustrates a signal flow for management of interference between base stations according to one embodiment.

FIG. 13 illustrates a signal flow for management of interference between base stations according to one embodiment. FIG. 13 illustrates the base station 120 as an interfering base station and the base station 110 as an interfered base station, but according to cases, the base station 120 can be an interfered base station and the base station 110 can be an interfering base station.

Referring to FIG. 13, in step 1301, the interfered base station can generate or update a beam index interference table. In step 1303, the interfered base station can transmit the generated or updated interference table to the interfering base station. In step 1307, the interfered base station can determine receive beam indexes. In step 1309, the interfered base station can determine a use frequency resource based on the interference table and the receive beam indexes, and determine a subframe index in consideration of uplink/downlink traffics. In step 1311, the interfered base station can transmit the frequency resource information, the determined receive beam index and/or subframe indexes information to the interfering base station.

In step 1305, the interfering base station can determine a transmit beam index for a downlink. In step 1313, the interfering base station can allocate a frequency resource, based on the received interference table, the received receive beam index information of the interfered base station, the subframe indexes information, and at least one or more transmit beam indexes determined by the interfering base station. In step 1315, the interfering base station and/or the interfered base station can each communicate with corresponding user equipments, using the determined beam index and the frequency resource.

Figure 14:
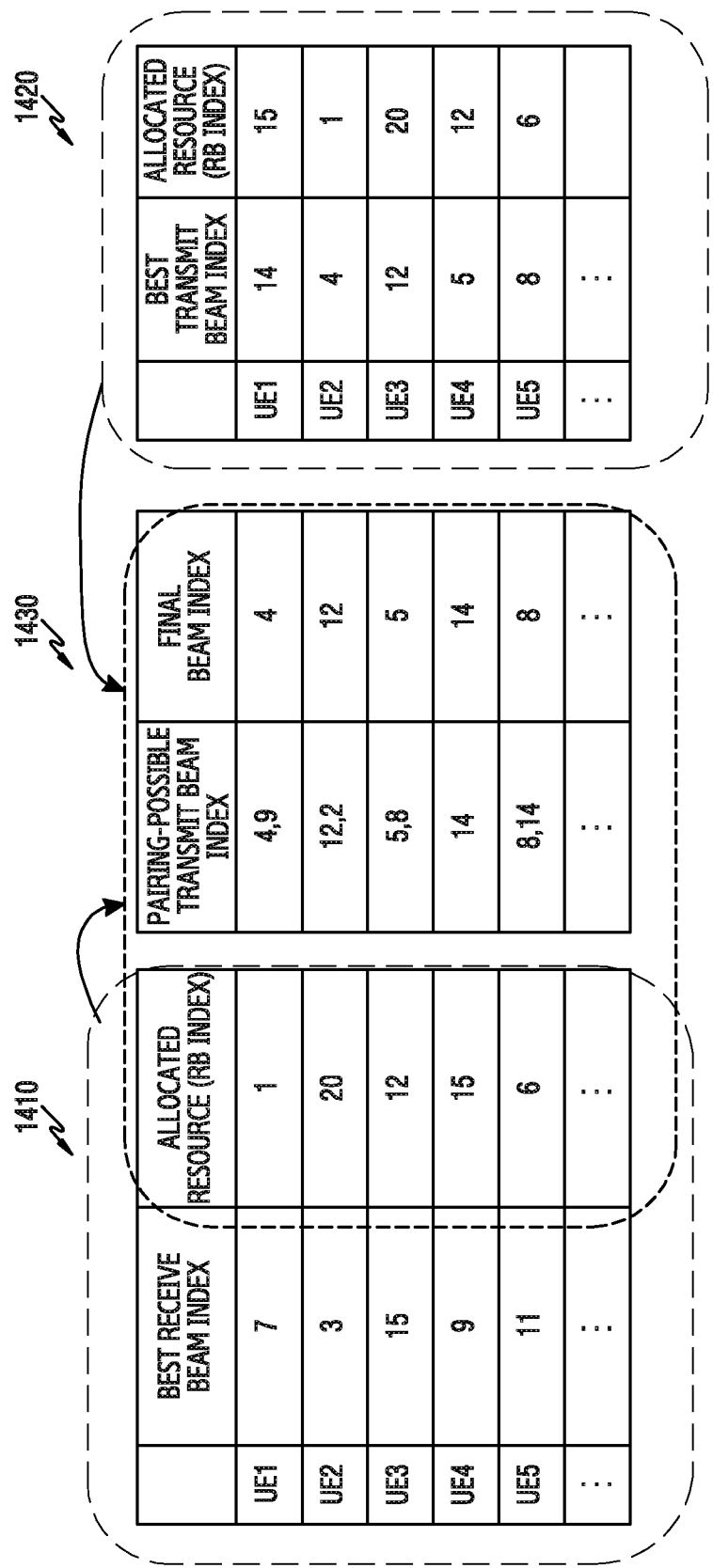
FIG. 14 illustrates beam index table information for management of interference between base stations according to one embodiment.

FIG. 14 illustrates beam index table information for management of interference between base stations according to one embodiment. The beam index table information is generated by an interfering base station. For description convenience, FIG. 14 limits beam index information for management of interference between base stations to a table form, but in accordance with various embodiments, a beam index for the management of the interference between the base stations can be generated in another form, not a table.

Referring to FIG. 14, a table 1410 can include receive beam indexes information for an uplink of an interfered base station, and frequency resource information. For example, the table 1410 can include receive beam indexes information of the base station 110, and frequency resource information. A table 1420 can include transmit beam indexes information for a downlink of an interfering base station, and frequency resource information. For example, the table 1420 can include transmit beam indexes information of the base station 120, and frequency resource information. A table 1430 can include transmit beam index information for a downlink that the interfering base station determines based on the table 1410 and/or the table 1420. Though not illustrated in FIG. 14, the base station 110 and/or the base station 120 can each include the interference table. The interference table can indicate information about beam indexes being under the influence of interference among beam indexes for respective user equipments.

For example, the table 1410 can include a receive beam index for each of a plurality of user equipments communicating with the base station 110, and frequency resource information. Referring to the table 1410, the best beam index for receiving a signal from a UE 1 is 7. Also, a frequency Resource Block (RB) index allocated for receiving a signal from the UE 1 is 1. That is, the base station 110 has allocated a frequency resource of the index 1 and a receive beam of the index 7, to the UE 1.

The table 1420 can include a transmit beam index for each of a plurality of UEs communicating with the base station 120, and frequency resource information. Referring to the table 1420, the best beam index for transmitting a signal to the UE 1 corresponds to 14. Also, a frequency resource block index allocated for transmitting a signal to the UE 1 corresponds to 15.

For example, the base station 120 can determine a beam index 4 and a beam index 9, based on the interference table received from the base station 110 and/or the table 1410. The beam index 4 and the beam index 9 indicate beam indexes in which transmission is possible without the influence of interference while the base station 110 communicates with the UE 1 by using an uplink. Similarly, the base station 120 can determine a beam index 12 and a beam index 2, based on the interference table received from the base station 110 and/or the table 1410. The beam index 12 and the beam index 2 indicate beam indexes in which transmission is possible without the influence of interference while the base station 110 communicates with the UE 2 by using an uplink. The base station 120 can determine beam indexes in which transmission is possible without the influence of interference for each of a plurality of UEs, using the same method as the aforementioned method.

In case where the determined transmit beam indexes are two or more, the base station 120 can determine one transmit beam index in consideration of transmit beam indexes for other UEs. For example, because the base station 120 has determined a transmit beam index 14 not exerting the influence of interference on a UE 4, the base station 120 can determine a transmit beam index 8 not overlapped with a transmit beam for the UE 4, among the transmit beam index 8 determined for a UE 5 and the transmit beam index 14. Similarly, because the base station 120 has determined the transmit beam index 8 not exerting the influence of interference on the UE 5, the base station 120 can determine a transmit beam index 5 not overlapped with a transmit beam for the UE 5, among the transmit beam index 5 determined for a UE 3 and the transmit beam index 8. The base station 120 can determine the final beam indexes in which transmission is possible without the influence of interference for each of a plurality of UEs, using the same method as the aforementioned method.

If the final beam index for each of the plurality of UEs is determined, the base station 120 can determine a frequency resource for each of the plurality of UEs. For example, the base station 120 has determined the final transmit beam index 4 that does not have the influence of interference while the base station 110 communicates with a UE 1 by using an uplink, so while the base station 110 communicates with the UE 1 by using a frequency resource block index 1, the base station 120 can communicate with a UE 2 indicating the transmit beam index 4 by using the same frequency resource block index (i.e., frequency resource block index 1). Similarly, the base station 120 has determined the final transmit beam index 12 that does not have the influence of interference while the base station 110 communicates with the UE 2 by using an uplink, so while the base station 110 communicates with the UE 2 by using a frequency resource block index 20, the base station 120 can communicate with a UE 3 indicating the transmit beam index 12 by using the same frequency resource block index (i.e., frequency resource block index 20).

Figure 15:
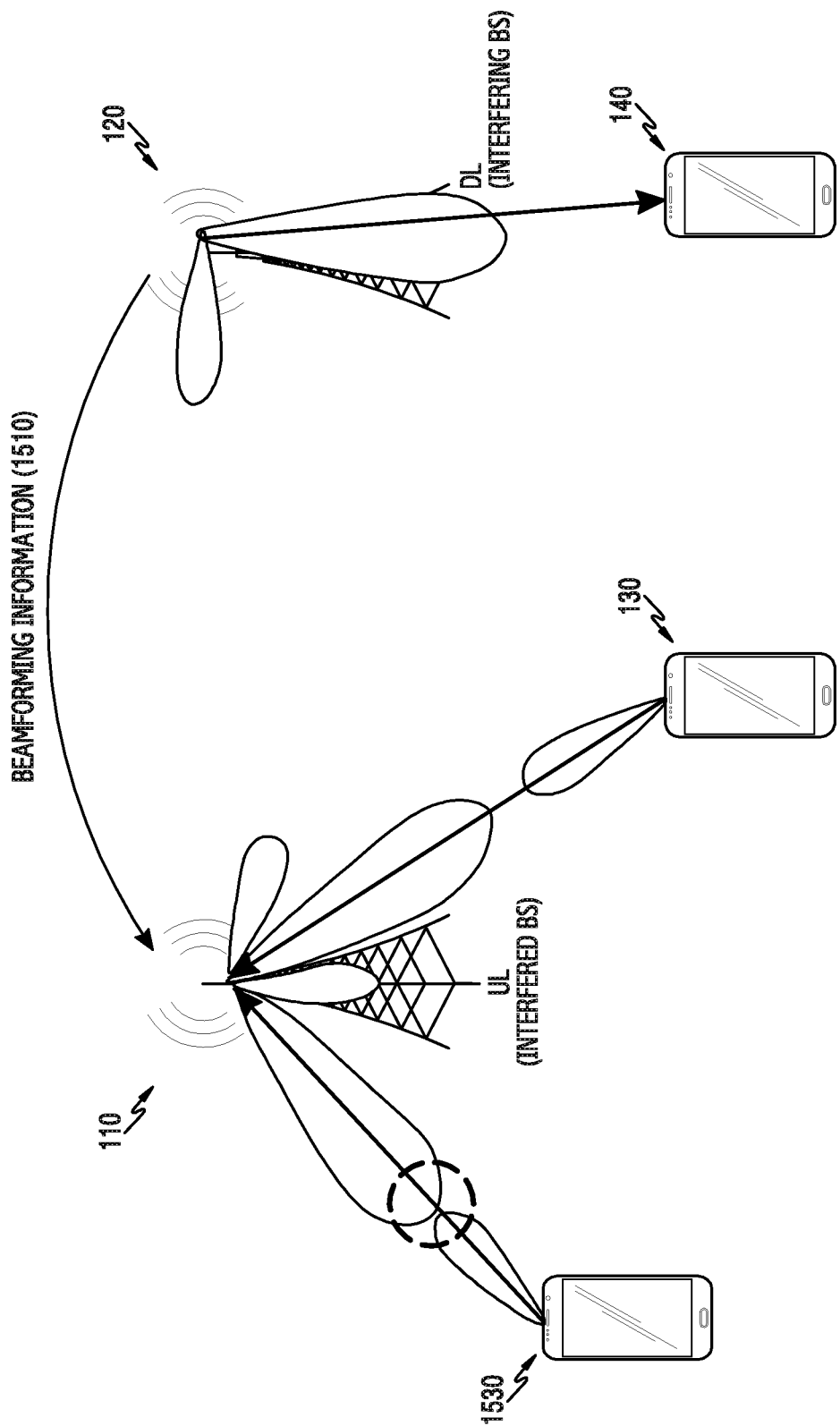
FIG. 15 illustrates a wireless communication system according to another embodiment.

FIG. 15 illustrates a wireless communication system according to another embodiment. FIG. 15 exemplifies an operation in which an interfered base station performs beamforming for receiving an uplink signal, based on beamforming information 1510 received from an interfering base station. A base station 110, a base station 120, a user equipment 130, and a user equipment 140 illustrated in FIG. 15 can correspond with the base stations and the user equipments illustrated in FIG. 6.

Referring to FIG. 15, the base station 120 transmits the beamforming information 1510 determined by the control unit 520, to the base station 110. The beamforming information 1510 can include a transmit beam index for a downlink, and a frequency resource. Also, the beamforming information 1510 can include subframe indexes information.

The base station 110 can determine beamforming information for an uplink, based on the received beamforming information 1510 and at least one or more receive beam indexes determined by the control unit 420. The determined beamforming information for the uplink can include a receive beam index for the uplink, and a frequency resource. The receive beam index and frequency resource correspond to a receive beam index and frequency resource for minimizing interference between the base station 110 and the base station 120. The base station 110 can receive an uplink signal, using the determined beamforming information. For example, the base station 110 can determine that a signal received from the user equipment 130 can receive the influence of a transmission signal generated by the base station 120 communicating with the user equipment 140. In this case, the base station 110 can communicate with a user equipment 1530 that does not receive the influence of interference while the base station 120 communicates with the user equipment 140.

Figure 16:
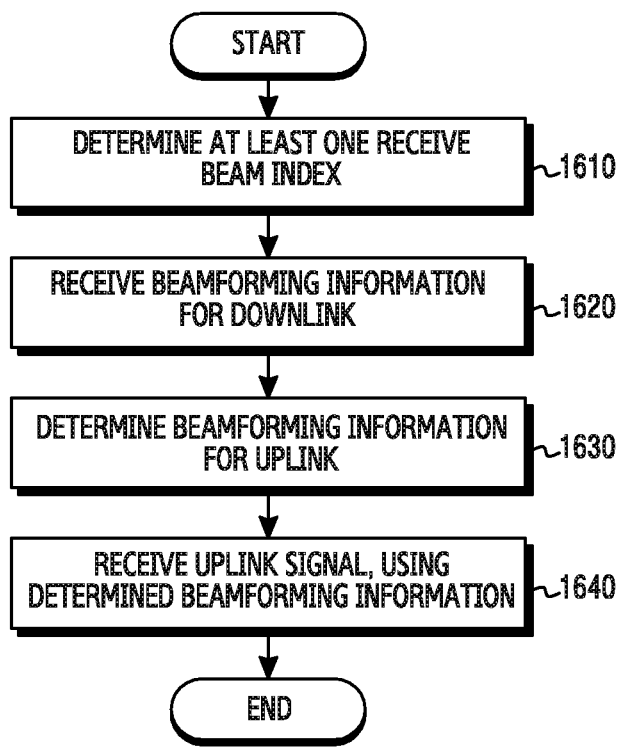
FIG. 16 illustrates a flowchart of an operation of an interfered base station according to another embodiment.

FIG. 16 illustrates a flowchart of an operation of an interfered base station according to another embodiment. The interfered base station can correspond to the base station 110 of FIG. 15.

Referring to FIG. 16, in step 1610, the base station 110 can determine at least one or more receive beam indexes for an uplink. The base station 110 can periodically determine the at least one or more receive beam indexes. For example, the base station 110 can update at least one or more receive beam indexes information after receiving an uplink signal in step 1640.

In step 1620, the base station 110 can receive beamforming information for a downlink from the base station 120. The beamforming information for the downlink can be received by periods. For example, the base station 110 can receive updated beamforming information for a downlink from the base station 120 after receiving an uplink signal in step 1640. For description convenience, FIG. 16 illustrates step 1610 and step 1620 in order, but the order does not limit the content of the present disclosure or the scope of claims. For example, the base station 110 can determine the at least one or more receive beam indexes in step 1610 after receiving the beamforming information for the downlink in step 1620.

In step 1630, the base station 110 can determine beamforming information for an uplink, based on the received beamforming information and the determined at least one or more receive beam indexes. The determined beamforming information is determined in consideration of the influence of interference between the base station 110 and the base station 120. The base station 110 can periodically determine the beamforming information. For example, the base station 110 can update the beamforming information, based on at least one or more receive beam indexes information that is updated after receiving an uplink signal in step 1640.

In step 1640, the base station 110 can receive an uplink signal, using the determined beamforming information. The uplink signal can correspond to a signal minimizing the influence of interference of a downlink signal that the base station 120 transmits. The base station 110 can periodically receive the uplink signal. For example, the base station 110 can receive the uplink signal, using the updated beamforming information. Here, the uplink signal can be a signal generated from a user equipment different from an existing user equipment transmitting a signal.

Figure 17:
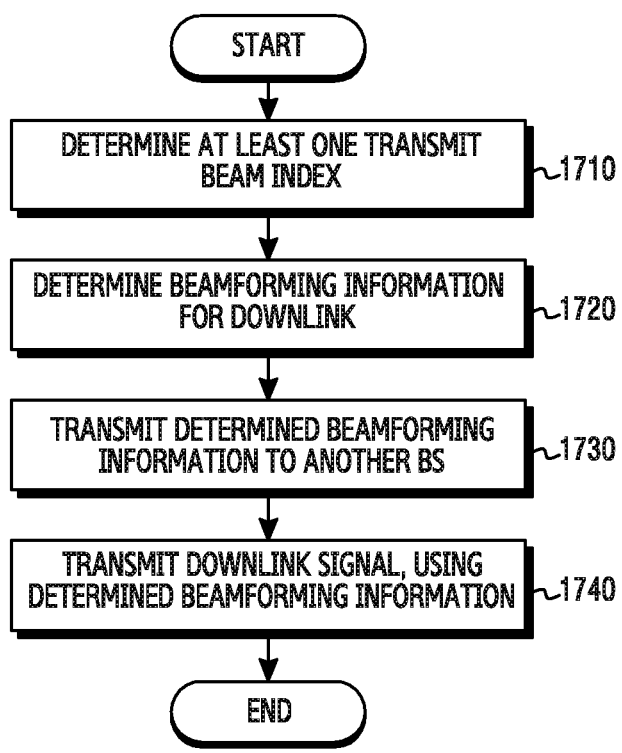
FIG. 17 illustrates a flowchart of an operation of an interfering base station according to another embodiment.

FIG. 17 illustrates a flowchart of an operation of an interfering base station according to another embodiment. The interfering base station can correspond to the base station 120 of FIG. 15.

Referring to FIG. 17, in step 1710, the base station 120 can determine at least one or more transmit beam indexes. The base station 120 can periodically determine the at least one or more transmit beam indexes. For example, the base station 120 can update at least one or more transmit beam indexes information after transmitting a downlink signal in step 1740.

In step 1720, the base station 120 can determine beamforming information for a downlink, based on the determined at least one or more transmit beam indexes information. The beamforming information for the downlink can be determined based on the determined at least one or more transmit beam indexes and/or an interference table. Though not illustrated in FIG. 17, the interference table can be received from the base station 110 by periods. Also, the beamforming information for the downlink can be determined by periods. For example, the base station 120 can again determine beamforming information for a downlink, based on the at least one or more transmit beam indexes that is updated after transmitting a downlink signal in step 1740.

In step 1730, the base station 120 can transmit the determined beamforming information to another base station. For example, the base station 120 can transmit the determined beamforming information to the base station 110 receiving an uplink signal. The determined beamforming information can include a transmit beam index for a downlink, a frequency resource, and/or subframe indexes information.

In step 1740, the base station 120 can transmit a downlink signal, using the determined beamforming information. The downlink signal can be transmitted by periods. For example, the base station 120 can transmit the downlink signal, using the again determined beamforming information for the downlink. Here, the downlink signal can be transmitted to a user equipment different from an existing user equipment receiving a signal.

Figure 18:
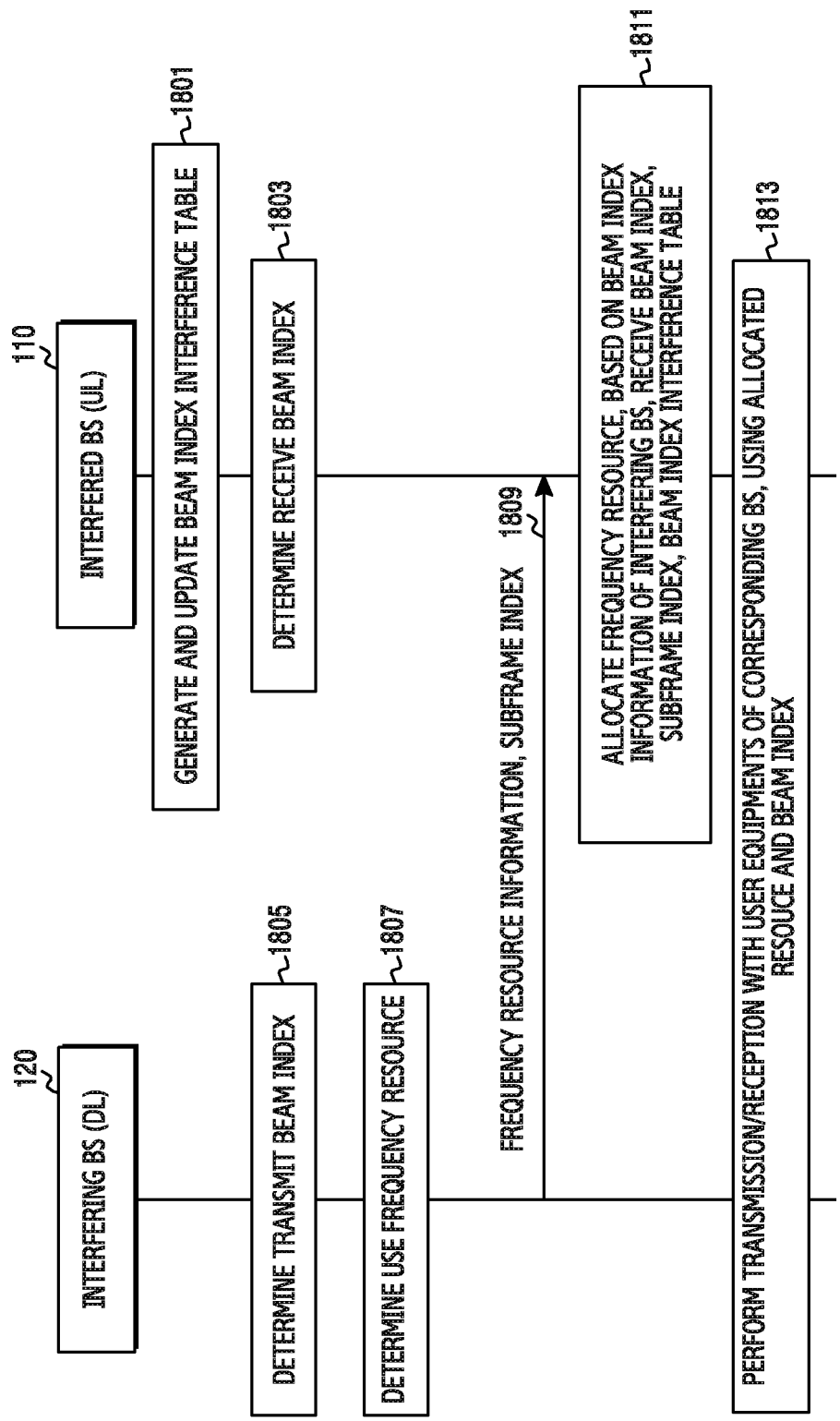
FIG. 18 illustrates a signal flow for management of interference between base stations according to another embodiment.

FIG. 18 illustrates a signal flow for management of interference between base stations according to another embodiment. FIG. 18 illustrates the base station 120 as an interfering base station and the base station 110 as an interfered base station, but according to cases, the base station 120 can be an interfered base station and the base station 110 can be an interfering base station.

Referring to FIG. 18, in step 1801, the interfered base station can generate or update a beam index interference table. In step 1803, the interfered base station can determine a receive beam index. In step 1805, the interfering base station can determine a transmit beam index. In step 1807, the interfering base station can determine a use frequency resource, based on the determined transmit beam index. In step 1809, the interfering base station can transmit information about the determined transmit beam index and frequency resource and subframe indexes to the interfered base station. In step 1811, the interfered base station can allocate a frequency resource, based on the beam index and subframe index information of the interfering base station, the determined receive beam index, and an interference table. In step 1813, the interfering base station and the interfered base station can each communicate with corresponding user equipments, using the determined beam index and the frequency resource.

Figure 19:
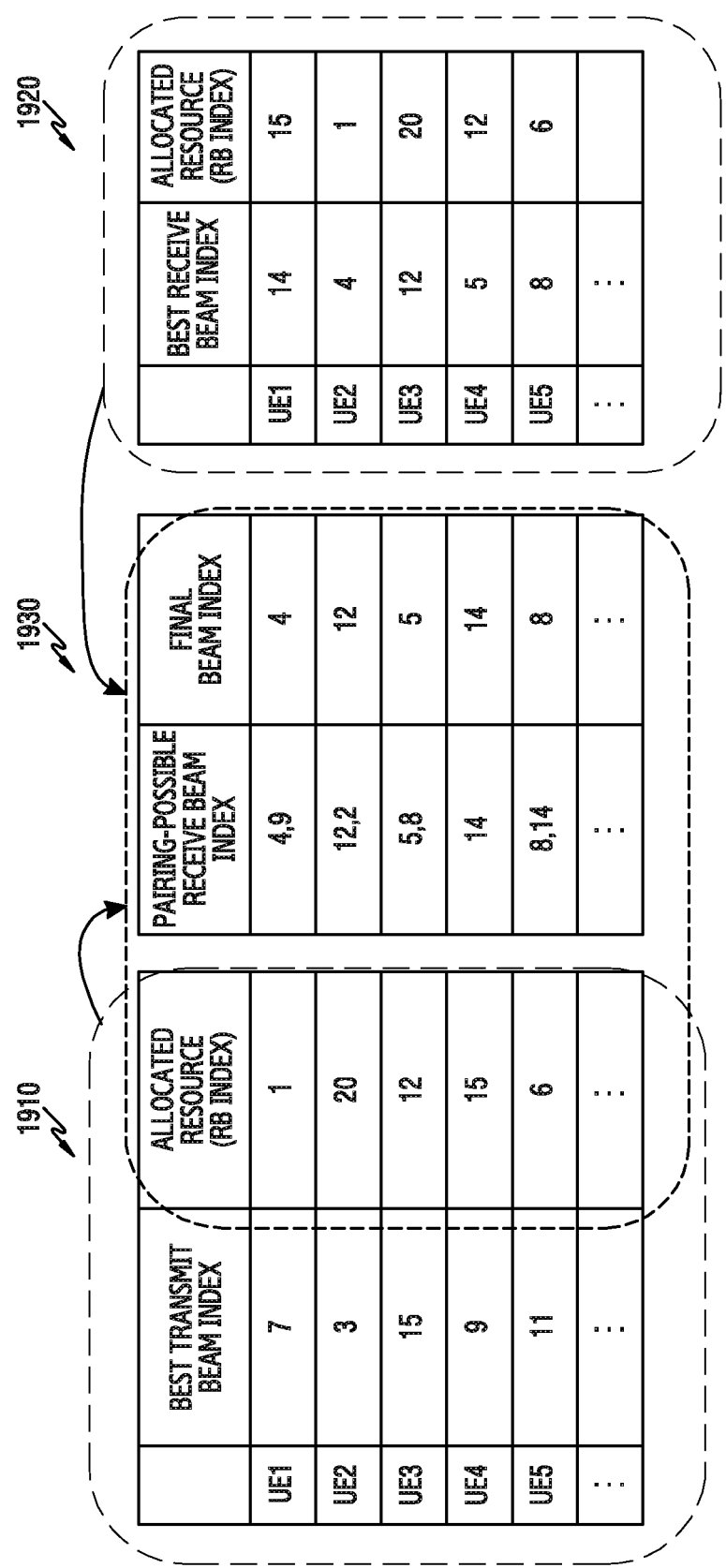
FIG. 19 illustrates beam index table information for management of interference between base stations according to another embodiment.

FIG. 19 illustrates beam index table information for management of interference between base stations according to another embodiment. The beam index table information is generated by an interfered base station. In accordance with various embodiments, the beam index table information for the management of the interference between the base stations can be generated in another form, not a table.

Referring to FIG. 19, a table 1910 can include transmit beam indexes information for a downlink of an interfering base station, and frequency resource information. For example, the table 1910 can include the transmit beam indexes information of the base station 120, and the frequency resource information. A table 1920 can include receive beam indexes information for an uplink of an interfered base station, and frequency resource information. For example, the table 1920 can include the receive beam indexes information of the base station 110, and frequency resource information. A table 1930 can include receive beam index information for an uplink that the interfered base station determines based on the table 1910 and/or the table 1920. Though not illustrated in FIG. 19, the base station 110 and/or the base station 120 can each include an interference table. The interference table can indicate information about beam indexes being under the influence of interference among beam indexes for respective user equipments.

For example, the table 1910 can include a transmit beam index for each of a plurality of user equipments communicating with the base station 120, and frequency resource information. Referring to the table 1910, the best beam index for transmitting a signal to a UE 1 is 7. Also, a frequency Resource Block (RB) index allocated for transmitting a signal to the UE 1 is 1.

Also, the table 1920 can include a receive beam index for each of a plurality of UEs communicating with the base station 110, and frequency resource information. Referring to the table 1920, the best beam index for receiving a signal from the UE 1 corresponds to 14. Also, a frequency resource block index allocated for receiving a signal from the UE 1 corresponds to 15.

For example, the base station 110 can determine a beam index 4 and a beam index 9, based on the interference table, the table 1920 and/or the table 1910. The beam index 4 and the beam index 9 indicate beam indexes in which reception is possible without the influence of interference while the base station 120 communicates with the UE 1 by using a downlink. Similarly, the base station 110 can determine a beam index 12 and a beam index 2, based on the interference table, the table 1920 and/or the table 1910. The beam index 12 and the beam index 2 indicate beam indexes in which reception is possible without the influence of interference while the base station 120 communicates with a UE 2 by using a downlink. The base station 110 can determine beam indexes in which reception is possible without the influence of interference for each of a plurality of UEs, using the same method as the aforementioned method.

In case where the determined receive beam indexes are two or more, the base station 110 can determine one receive beam index in consideration of receive beam indexes for other UEs. For example, because the base station 110 has determined a transmit beam index 14 not exerting the influence of interference on a UE 4, the base station 110 can determine a receive beam index 8 not overlapped with a receive beam for the UE 4 among the receive beam index 8 determined for a UE 5 and the transmit beam index 14. Similarly, because the base station 110 has determined the receive beam index 8 not exerting the influence of interference on the UE 5, the base station 110 can determine a receive beam index 5 not overlapped with a receive beam for the UE 5 among the receive beam index 5 determined for a UE 3 and the receive beam index 8. The base station 110 can determine the final beam indexes in which reception is possible without the influence of interference for each of a plurality of UEs, using the same method as the aforementioned method.

If the final beam index for each of the plurality of UEs is determined, the base station 110 can determine a frequency resource for each of the plurality of UEs. For example, the base station 110 has determined the final receive beam index 4 that does not have the influence of interference while the base station 120 communicates with a UE 1 by using an uplink, so while the base station 110 can communicate with the UE 1 by using a frequency resource block index 1, the base station 110 can communicate with a UE 2 indicating the receive beam index 4 by using the same frequency resource block index (i.e., frequency resource block index 1). Similarly, the base station 110 has determined the final receive beam index 12 that does not have the influence of interference while the base station 120 communicates with the UE 2 by using a downlink, so while the base station 120 communicates with the UE 2 by using a frequency resource block index 20, the base station 110 can communicate with a UE 3 indicating the receive beam index 12 by using the same frequency resource block index (i.e., frequency resource block index 20).

Figure 20:
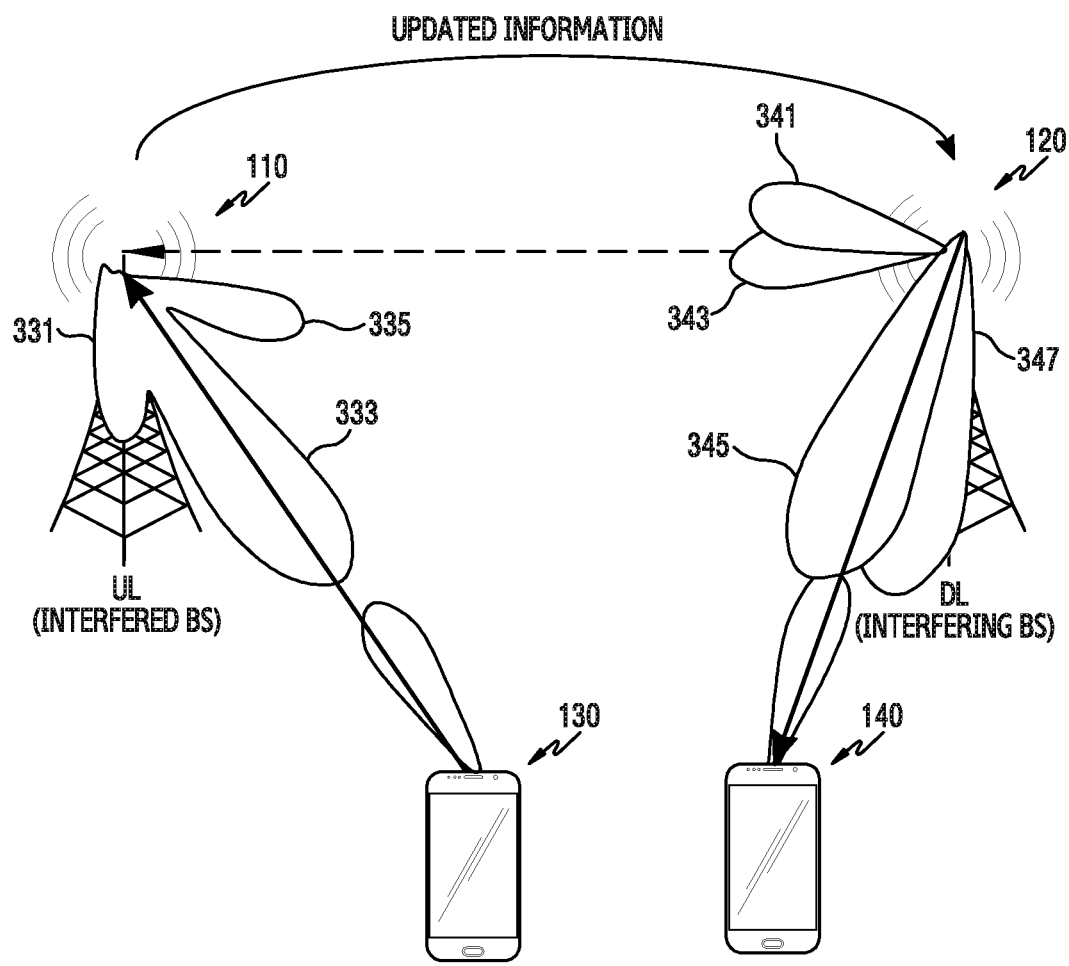
FIG. 20 illustrates a wireless communication system according to a further embodiment.

FIG. 20 illustrates a wireless communication system according to a further embodiment. FIG. 20 illustrates a process in which the base station 110 and/or the base station 120 detect a frequency band generating interference after transceiving an uplink or downlink signal, and update beamforming information.

Referring to FIG. 20, the base station 110 can detect a frequency band generating interference between the base station 110 and the base station 120, using the interference frequency band determination module 765. For example, while the base station 110 receives an uplink signal from a user equipment 130 by using a receive beam 333, a transmit beam 345 for the base station 120 to transmit a downlink signal to a user equipment 140 can exert interference on the receive beam 333. In this case, the base station 110 can update beamforming information for an uplink. The beamforming information for the uplink can include an interference table, at least one or more receive beam indexes, and/or subframe indexes. The base station 110 can transmit the updated beamforming information for the uplink to the base station 120.

The base station 120 can update beamforming information for a downlink, based on the updated beamforming information for the uplink and beamforming information for a downlink determined by the beamforming module 525. The updated beamforming information for the downlink can include a transmit beam index for the downlink and a frequency resource. Also, the updated beamforming information for the downlink can include subframe indexes. The base station 120 can transmit a downlink signal to the user equipment 140, using the updated beamforming information for the downlink.

Figure 21:
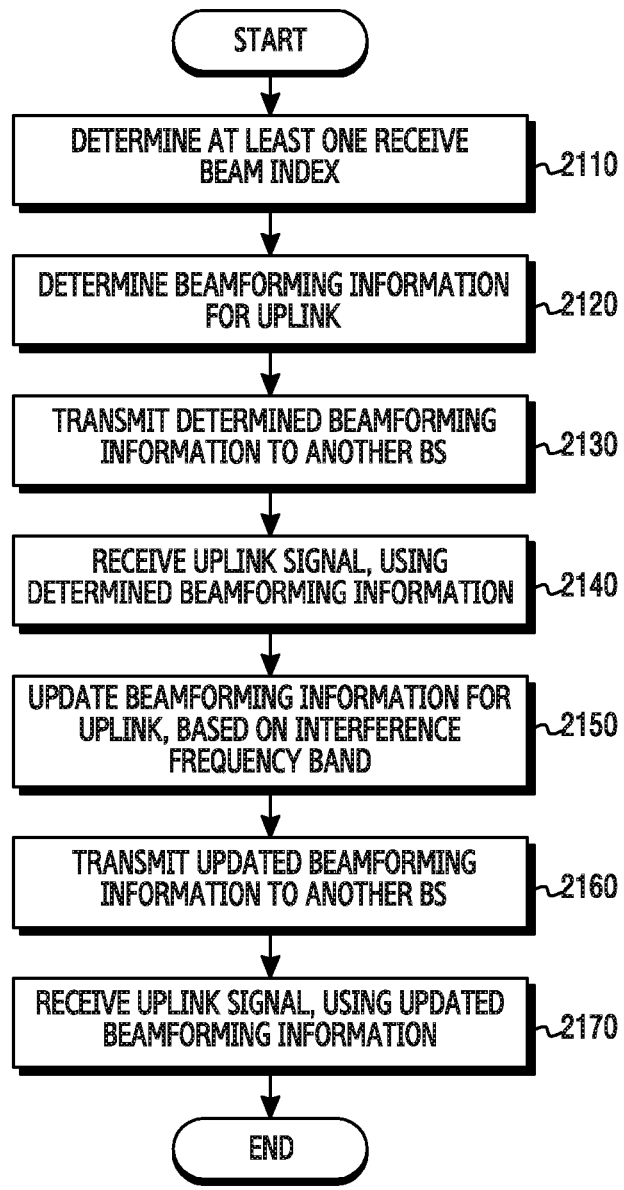
FIG. 21 illustrates a flowchart of an operation of an interfering base station according to a further embodiment.

FIG. 21 illustrates a flowchart of an operation of an interfered base station according to a further embodiment. The interfered base station can correspond to the base station 110 of FIG. 20.

Referring to FIG. 21, step 2110 to step 2140 can correspond to step 910 to step 940 illustrated in FIG. 9, respectively. In step 2150, the base station 110 can update beamforming information for an uplink, based on an interference frequency band. The base station 110 can periodically update the beamforming information for the uplink.

In step 2160, the base station 110 can transmit the updated beamforming information for the uplink to another base station. For example, the base station 110 can transmit the updated beamforming information for the uplink to the base station 120.

In step 2170, the base station 110 can receive an uplink signal, using the updated beamforming information for the uplink. For description convenience, FIG. 21 illustrates step 2160 and step 2170 in order, but the order does not limit the content of the present disclosure or the scope of claims. For example, the base station 110 can transmit the updated beamforming information for the uplink to another base station in step 2160 after receiving an uplink signal by using the updated beamforming information for the uplink in step 2170.

Figure 22:
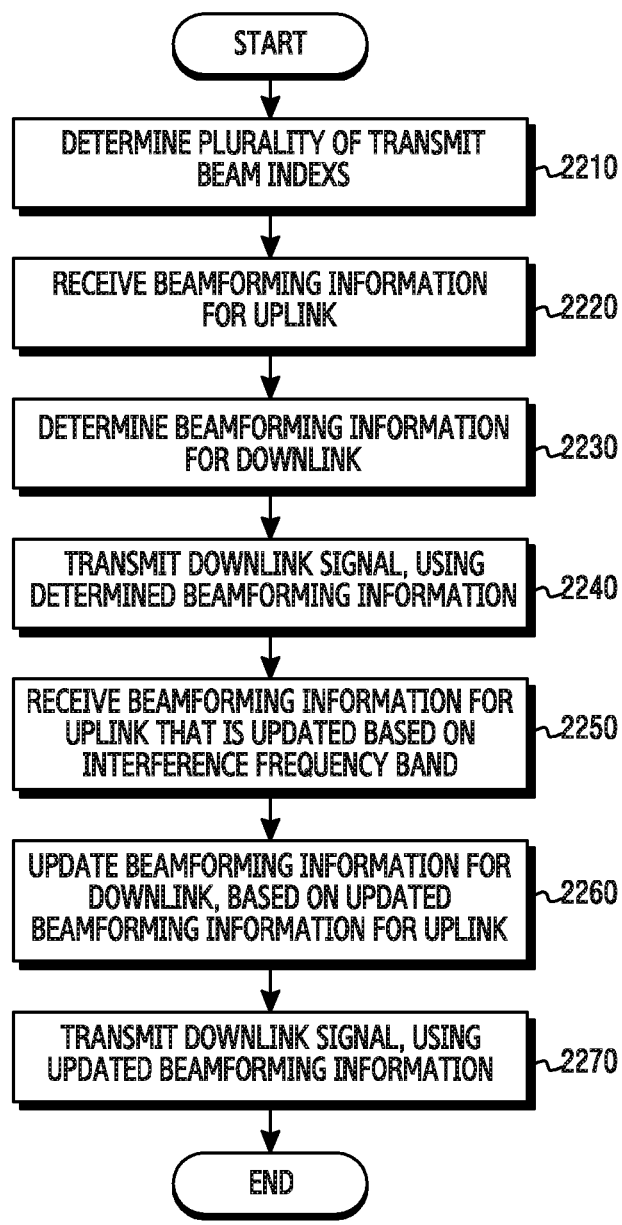
FIG. 22 illustrates a flowchart of an operation of an interfered base station according to a further embodiment.

FIG. 22 illustrates a flowchart of an operation of an interfering base station according to a further embodiment. The interfering base station can correspond to the base station 120 of FIG. 20.

Referring to FIG. 22, step 2210 to step 2240 can correspond to step 1110 to step 1140 illustrated in FIG. 11, respectively. In step 2250, the base station 120 can receive beamforming information for an uplink that is updated based on an interference frequency band, from the base station 110. The base station 120 can periodically receive the updated beamforming information for the uplink.

In step 2260, the base station 120 can update beamforming information for a downlink based on the updated beamforming information for the uplink. In step 2270, the base station 120 can transmit a downlink signal, based on the updated beamforming information for the downlink.

Figure 23:
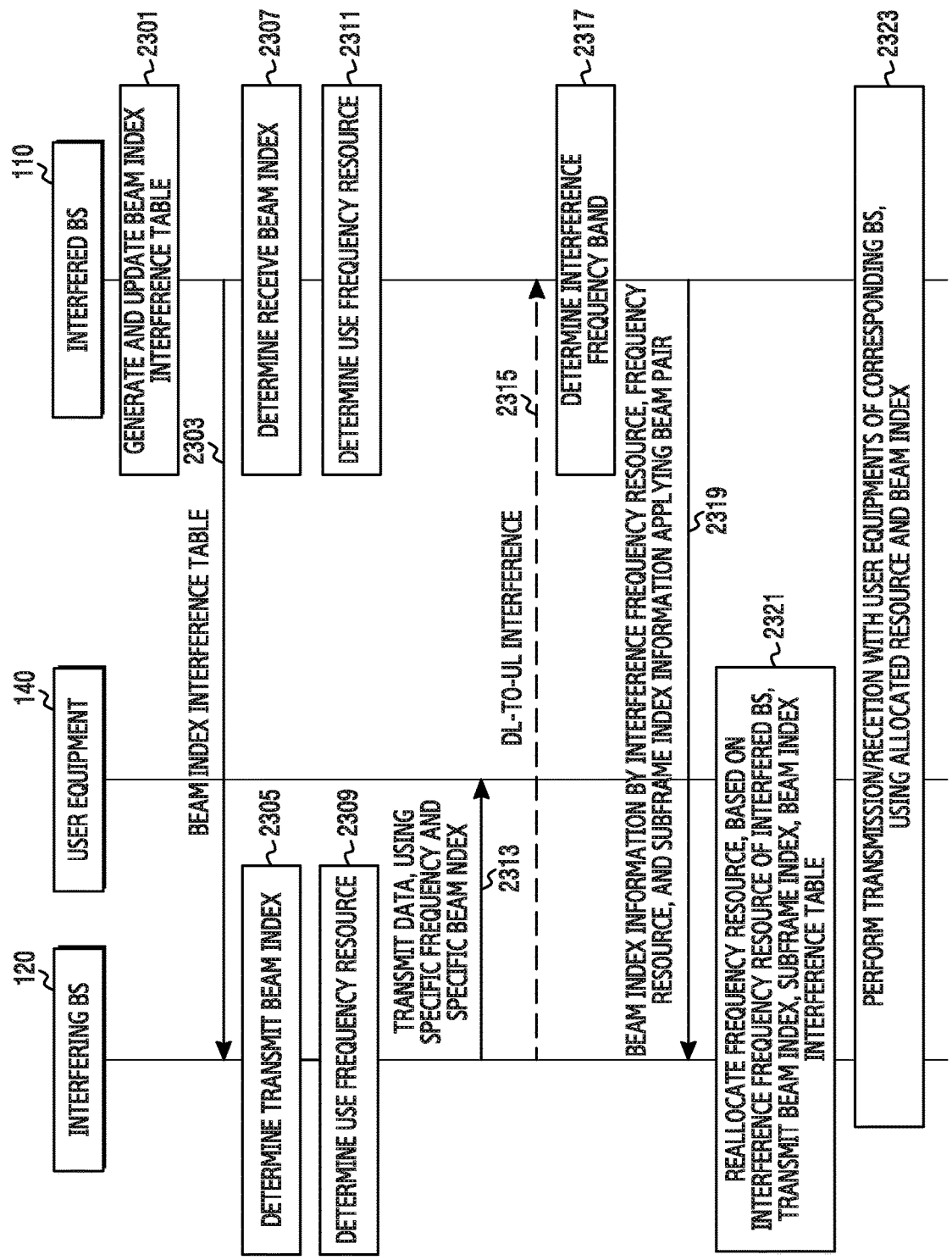
FIG. 23 illustrates a signal flow for management of interference between base stations according to a further embodiment.

FIG. 23 illustrates a signal flow for management of interference between base stations according to a further embodiment. FIG. 23 illustrates the base station 120 as an interfering base station and the base station 110 as an interfered base station, but according to cases, the base station 120 can be an interfered base station and the base station 110 can be an interfering base station.

In step 2301, the interfered base station can generate or update a beam index interference table. In step 2303, the interfered base station can transmit the generated or updated interference table to the interfering base station. Also, in step 2307 and step 2311, the interfered base station can determine a receive beam index and a use frequency resource. In step 2305 and step 2309, the interfering base station can determine a transmit beam index and a use frequency resource. In step 2313, the interfering base station transmits data to a user equipment 140, using the determined frequency resource and beam index.

But, in step 2315, the transmitted data signal exerts interference on the interfered base station. That is, the interference on the interfered base station is generated. In step 2317, the interfered base station can determine a frequency band receiving the influence of interference. For example, the interfered base station can determine a frequency band receiving the influence of interference, on the basis of a data reception error, a channel quality by band, etc. In step 2319, the interfered base station can transmit a beam index updated based on the frequency band receiving the influence of interference, a frequency resource, and subframe indexes information applying a beam pair, to the interfering base station. The beam pair represents beam indexes not being under the influence of interference between the interfered base station and the interfering base station. In step 2321, the interfering base station can reallocate a frequency resource to the user equipment 140, based on the interference frequency resource of the interfered base station, updated beam index information, a subframe index and the interference table. In other words, the interfering base station can again perform scheduling for data transmitted at a subframe generating interference in order that the interfering base station can again transmit the data transmitted at the subframe generating the interference. Or, the interfering base station performs scheduling in consideration of interference at next scheduling. In step 2323, the interfering base station and/or the interfered base station can communicate with corresponding user equipments respectively, using the updated beam index and the frequency resource.

As described above, interference control between base stations can be carried out by exchanging an interference table and/or a beam and frequency resource allocation result. In the aforementioned various embodiments, the beam and frequency resource allocation result is provided to an adjacent base station regardless of the existence or non-existence of interference between beams. But, if a beam not causing interference exists granting the adjacent base station uses any beam, a corresponding beam allocation result may not be forwarded. This can decrease an overhead of information. That is, in accordance with one embodiment, system operation employing a scheme in which the aforementioned interference control technique is limitedly applied only to a beam causing interference with the adjacent base station is possible. For this, the interference relationship determination of FIG. 24 below is required.

Figure 24:
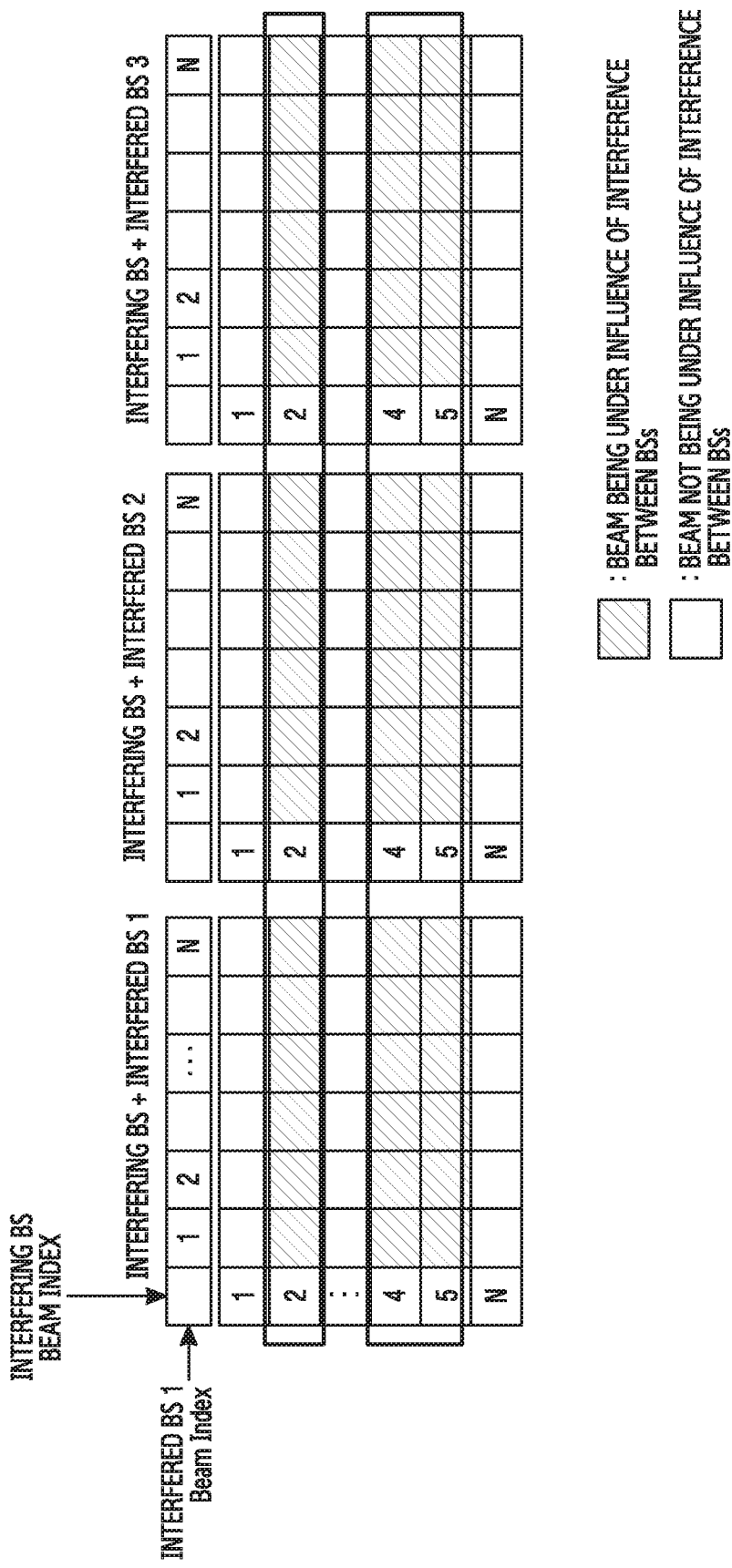
FIG. 24 illustrates an interference table according to one embodiment.

FIG. 24 illustrates an interference table according to one embodiment. Referring to FIG. 24, each of illustrated tables indicates beam indexes not being under the influence of interference between an interfering base station and an interfered base station, and beam indexes being under the influence of interference between the interfering base station and the interfered base station. For example, referring to an interference table for an interfering base station and an interfered base station 1, a beam index 3 of the interfering base station does not exert the influence of interference on any beam index of the interfered base station 1. Also, a beam index 2 of the interfering base station exerts the influence of interference on all beam indexes of the interfered base station 1.

For another example, referring to an interference table for an interfering base station and an interfered base station 2, a beam index 2 of the interfering base station exerts the influence of interference on all beam indexes of the interfered base station 2.

The base stations can classify beams causing interference and beams not causing interference. The beams not causing the interference can be allocated without any limit, but the beams causing the interference require scheduling with an adjacent base station.

Further, in case where the beams causing the interference and the beams not causing the interference can be distinguished as in FIG. 24, scheduling dividing a resource region in accordance with a beam index can be applied. That is, the beams causing the interference can be allocated to be used in a predefined orthogonal resource between adjacent base stations. For example, a scheduling scheme of FIG. 25A to FIG. 26B below can be used.

Figure 25A:
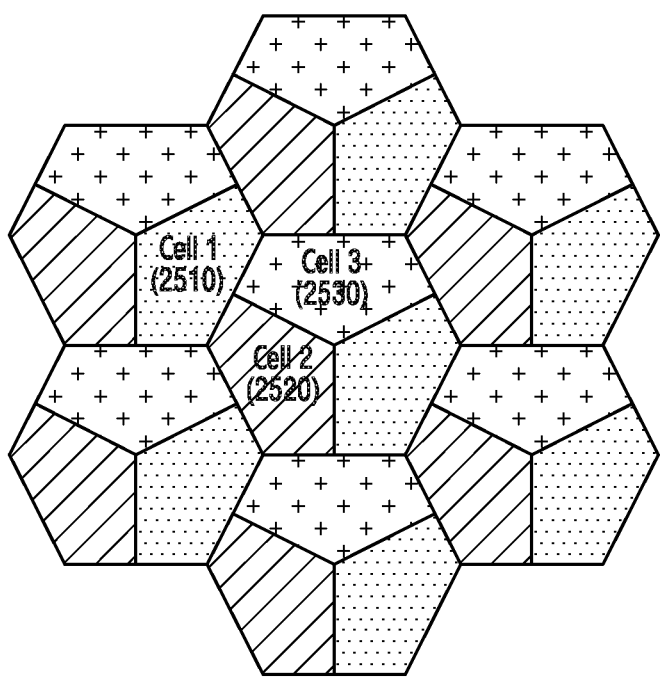
FIG. 25A and FIG. 25B illustrate diagrams for describing an operation of allocating a frequency in accordance with one embodiment.
Figure 25B:
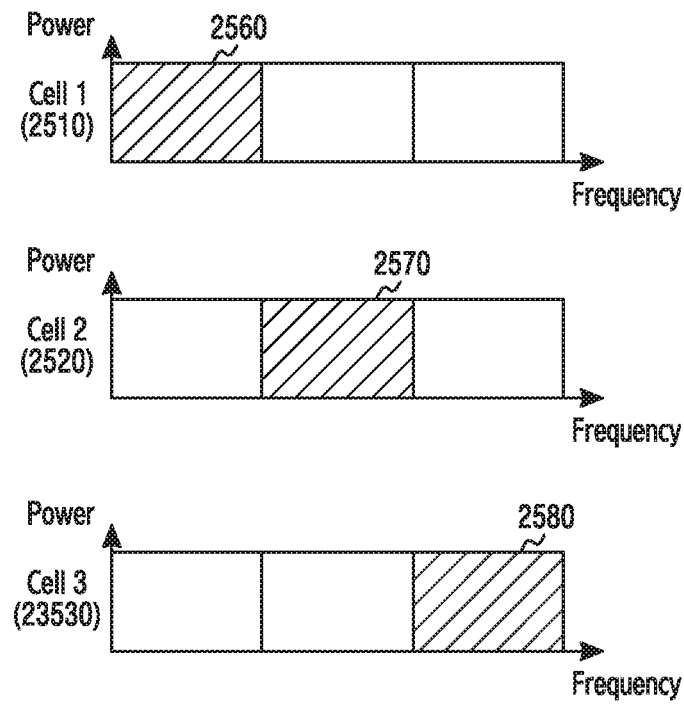

FIG. 25A and FIG. 25B illustrate diagrams for describing an operation of allocating a frequency in accordance with one embodiment.

FIG. 25A illustrates the cell coverage of a base station. Referring to FIG. 25A, a hexagonal figure indicates the cell coverage of each base station. For example, a cell 2510 can correspond to one cell among the cell coverage of a base station 110. Also, for example, each of a cell 2520 and a cell 2530 can corresponds to one cell among the cell coverage of a base station 120. Mutually adjacent cells represent cells being under the influence of interference between signals. For example, the cell 2510, the cell 2520, and/or the cell 2530 are adjacent to one another, so the cells can have the influence of interference between signals with one another.

FIG. 25B illustrates an operation in which base stations allocate frequency resources based on determined beam indexes. For example, a beam index 2560, a beam index 2570 and/or a beam index 2580 all indicate beam indexes being under the influence of interference between base stations. If the beam indexes are allocated at the same frequency band, interference between base stations can be generated. Accordingly, the base stations each allocate a frequency resource so that predetermined beam indexes can be orthogonal to one another. For example, as illustrated in FIG. 25B, each of the beam index 2560, the beam index 2570 and/or the beam index 2580 are allocated at mutually different frequency bands. If the resource satisfying the orthogonality is insufficient, interference between base stations is controlled by the method described in FIG. 3 to FIG. 23.

Figure 26A:
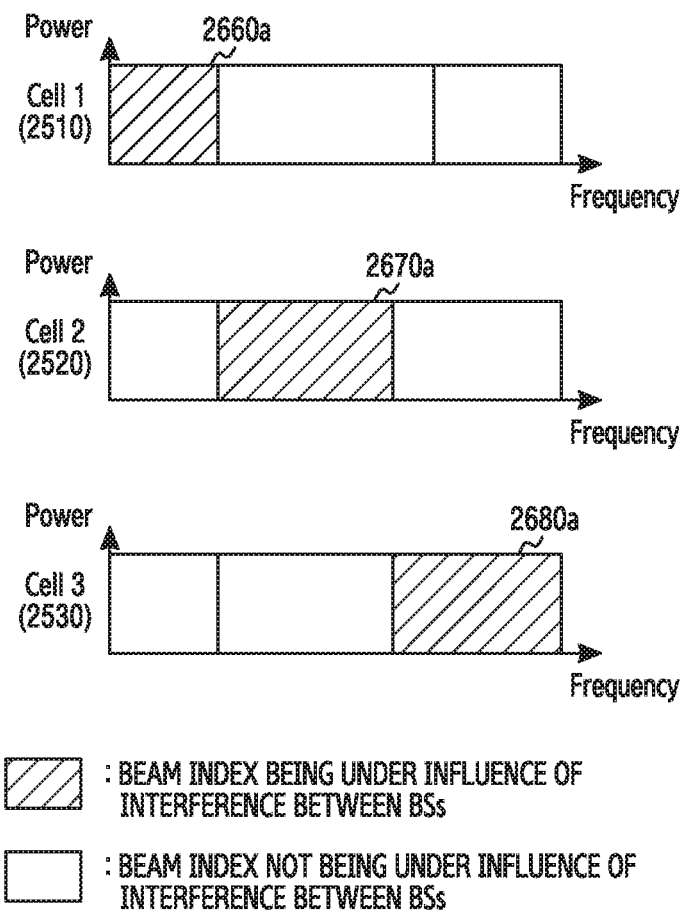
FIG. 26A and FIG. 26B illustrate diagrams for describing an operation of allocating a frequency in accordance with another embodiment.
Figure 26B:
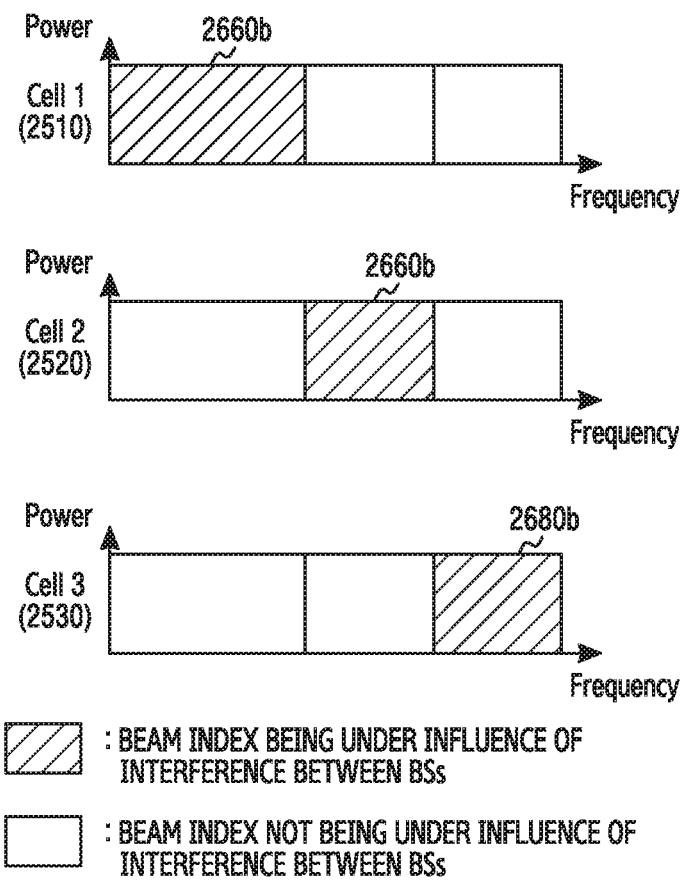

FIG. 26A and FIG. 26B illustrate diagrams for describing an operation of allocating a frequency in accordance with another embodiment. FIG. 26A and FIG. 26B illustrate an operation of flexibly allocating a frequency band, using predetermined beam indexes. For example, referring to FIG. 26A, a beam index 2660a is allocated for a narrow frequency band, whereas a beam index 2670a and a beam index 2680a are allocated for a wide frequency band. For another example, referring to FIG. 26B, a beam index 2660b is allocated for a wide frequency band, whereas a beam index 2670b and a beam index 2680b are allocated for a narrow frequency band.

Figure 27:
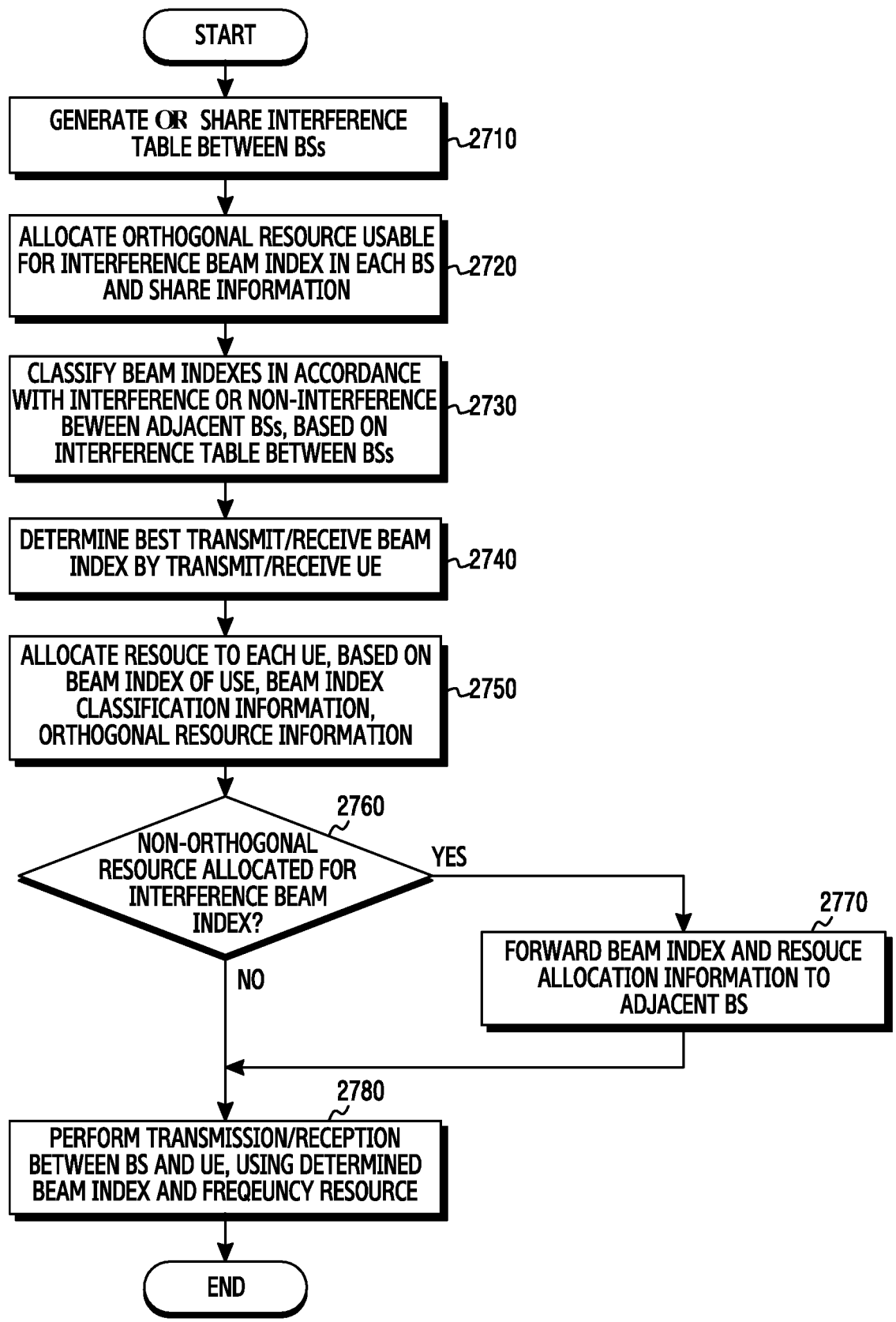
FIG. 27 illustrates a flowchart of an operation of allocating a frequency in accordance with one embodiment.

FIG. 27 illustrates a flowchart of an operation of allocating a frequency in accordance with one embodiment.

FIG. 27 exemplifies an operating method in which an interfered base station or an interfering base station allocates a frequency.

Referring to FIG. 27, in step 2710, the interfered base station generates an interference table between the base stations or transmits the interference table to the interfering base station. In step 2720, the interfered base station or the interfering base station can allocate an orthogonal resource capable of using a beam index for each base station, or share the allocated resource with another base station. In step 2730, the interfered base station or the interfering base station classifies beam indexes, based on the interference table. In step 2740, the interfered base station or the interfering base station determines a beam index for a user equipment, using the classified beam indexes. In step 2750, the interfering base station or interfered base station allocates a frequency resource to the user equipment, based on the determined beam index, information about the classified beam indexes, and/or the orthogonal resource. In step 2760, the interfering base station or interfered base station determines if a non-orthogonal resource has been allocated. If the non-orthogonal resource is allocated, in step 2770, the interfering base station or interfered base station transmits the beam index and resource allocation information to another base station and then, in step 2780, the interfering base station or interfered base station performs transmission/reception with the user equipment, using the beam index and resource allocation information. If the non-orthogonal resource is not allocated, in step 2780, the interfering base station or interfered base station performs transmission/reception with the user equipment, using the beam index and resource allocation information.

Methods according to embodiments mentioned in claims of the present disclosure or a specification thereof can be implemented in a form of hardware, software, or a combination of the hardware and the software.

This software can be stored in a computer-readable storage medium. The computer-readable storage medium stores at least one program including instructions enabling an electronic device to execute a method of the present disclosure when the instructions are executed by at least one processor in at least one program (software module) and/or the electronic device.

This software can be stored in a volatile storage device or a non-volatile storage device such as a Read Only Memory (ROM), or a memory such as a Random Access Memory (RAM), a memory chip, or a device or integrated circuit, or an optical or magnetic readable medium such as a Compact Disc-ROM (CD-ROM), a Digital Versatile Disc (DVD), a magnetic disc, a magnetic tape, etc.

The storage device and storage medium are embodiments of a program including instructions of implementing one embodiment at execution, or a machine-readable storage means suitable for storing the programs. The embodiments provide a program including a code for implementing an apparatus or method as claimed in any one of claims of the present specification, and a machine-readable storage medium storing such the program. Further, such the program can be electronically forwarded by any medium such as a communication signal forwarded through a wired or wireless connection, and the embodiments include an equivalent properly.

In the aforementioned concrete embodiments, constituent elements included in the invention have been expressed in a singular form or plural form in accordance to a proposed concrete embodiment. But, the expression of the singular form or plural form is chosen suitable for a proposed situation for description convenience. The aforementioned embodiments are not limited to singular or plural constituent elements and, granted a constituent element is expressed in the plural form, it can be configured in the singular form, or granted a constituent element is expressed in the singular form, it can be configured in the plural form.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a first base station in a wireless communication system, the method comprising:
   determining a set of first beams to be used for an uplink communication with a first user equipment (UE) of at least one UE;
   receiving, from a second base station, interference information indicating at least one beam indexes causing interference between the first base station and the second base station, and resource information indicating a set of second beams and a set of second frequency resources to be used for a downlink communication with a second UE of the at least one UE by the second base station;
   determining at least one first beam among the set of first beams and at least one frequency resource allocated to the at least one beam based on the interference information and the resource information, wherein, when the at least one first beam for the first UE among the at least one UE does not cause interference with at least one second beam among the set of second beams for the second UE among the at least one UE, at least one first frequency resource which is a same frequency resource as at least one second frequency resource allocated to the at least one second beam among the set of second frequency resources is allocated to the at least one first beam, wherein, when the at least one first beam for the first UE causes interference with the at least one second beam for the second UE, at least one first frequency resource which is orthogonal to the at least one second frequency resource is allocated to the at least one first beam; and
   performing an uplink communication with the first UE through the at least one first beam by using the at least one first frequency resource while the second base station performs a downlink communication with the second UE through the at least one second beam by using the at least one second frequency resource.

2. The method of claim 1, further comprising:
receiving, from the second base station, first information about interference between the first base station and the second base station from the second base station.

3. The method of claim 2, further comprising:
receiving, from the second base station, second information about an interference frequency band between the first base station and the second base station; and
updating a frequency resource allocation of the first base station, based on the second information.

4. The method of claim 1, further comprising:
generating first information about interference between the first base station and the second base station.

5. The method of claim 4, further comprising:
generating second information about an interference frequency band between the first base station and the second base station; and
transmitting the second information to the second base station.

6. The method of claim 1, wherein beams of the first base station are classified into a first beam group and a second beam group, and
further comprising:
receiving information about the first beam group from the second base station,
wherein the first beam group comprises one or more beams not being under influence of interference between the first base station and the second base station, and
the second beam group comprises one or more beams being under influence of interference between the first base station and the second base station.

7. A second base station in a wireless communication system, the second base station comprising:
at least one transceiver configured to communicate with a first base station and at least one user equipment (UE); and
at least one processor operatively coupled with the at least one transceiver and configured to:
determine interference information indicating at least one beam indexes causing interference between the first base station and the second base station,
determine a set of second beams, and a set of second frequency resources to be used for a downlink communication with the at least one UE,
transmit, to the first base station, the interference information and resource information indicating the set of second beams and the set of second frequency resources, and
perform a downlink communication with a second UE among the at least one UE through at least one second beam among the set of second beams using at least one second frequency resource while the first base station performs an uplink communication with a first UE among the at least one UE through at least one first beam by using at least one frequency resource,
wherein, when the at least one first beam for the first UE does not cause interference with the at least one second beam for the second UE, the at least one first frequency resource which is a same frequency resource as the at least one second frequency resource allocated to the at least one second beam is allocated to the at least one first beam,
wherein, when the at least one first beam for the first UE causes interference with the at least one second beam for the second UE, at least one first frequency resource which is orthogonal to the at least one second frequency resource is allocated to the at least one first beam.

8. The second base station of claim 7, wherein the at least one processor is further configured to generate first information about interference between the first base station and the second base station, and transmit the first information about the interference between the first base station and the second base station, to the first base station.

9. The second base station of claim 8, wherein the at least one processor is further configured to generate second information about an interference frequency band between the first base station and the second base station, and transmit the second information to the first base station.

10. The second base station of claim 7, wherein the at least one processor is further configured to:
receive, from the first base station, second information about an interference frequency band between the first base station and the second base station, which is generated by the first base station.

11. The second base station of claim 7, wherein beams of the second base station are classified into a first beam group and a second beam group,
wherein the at least one processor is further configured to transmit, to the first base station, information about the second beam group,
wherein the first beam group comprises one or more beam not being under influence of interference between the first base station and the second base station, and
wherein the second beam group comprises one or more beam being under influence of interference between the first base station and the second base station.

12. A first base station in a wireless communication system, the first base station comprising:
at least one transceiver configured to communicate with a second base station and at least one user equipment (UE); and
at least one processor operatively coupled with the at least one transceiver and configured to:
determine a set of first beams to be used for an uplink communication with a first UE of the at least one UE,
receive, from a second base station, interference information indicating at least one beam index causing interference between the first base station and the second base station, and resource information indicating a set of second beams and a set of second frequency resources to be used for a downlink communication with a second UE of the at least one UE by the second base station,
determine at least one first beam among the set of first beams and at least one frequency resource allocated to the at least one beam based on the interference information and the resource information,
wherein, when the at least one first beam for the first UE among the at least one UE does not cause interference with at least one second beam among the set of second beams for the second UE among the at least one UE, at least one first frequency resource which is a same frequency resource as at least one second frequency resource allocated to the at least one second beam among the set of second frequency resources is allocated to the at least one first beam,
wherein, when the at least one first beam for the first UE causes interference with the at least one second beam for the second UE, at least one first frequency resource which is orthogonal to the at least one second frequency resource is allocated to the at least one first beam; and perform an uplink communication with the first UE through the at least one first beam by using the at least one first frequency resource while the second base station performs a downlink communication with the second UE through the at least one second beam by using the at least one second frequency resource.

13. The first base station of claim 12, wherein the at least one processor least is further configured to:

receive, from the second base station, first information about interference between the first base station and the second base station from the second base station.

14. The first base station of claim 13, wherein the at least one processor is configured to:

receive, from the second base station, second information about an interference frequency band between the first base station and the second base station, and update a frequency resource allocation of the first base station, based on the second information.

15. The first base station of claim 12, wherein the at least one processor is further configured to:

generate first information about interference between the first base station and the second base station.

16. The first base station of claim 15, wherein the at least one processor is further configured to:

generate second information about an interference frequency band between the first base station and the second base station, and transmit the second information to the second base station.

17. The first base station of claim 12, wherein beams of the first base station are classified into a first beam group and a second beam group, wherein the at least one processor is further configured to receive information about the second beam group from the second base station, and wherein the first beam group comprises one or more beam not being under influence of interference between the first base station and the second base station, and the second beam group comprises one or more beam being under influence of interference between the first base station and the second base station.

* * * * *